United States Patent
Ito et al.

(10) Patent No.: US 6,315,199 B1
(45) Date of Patent: Nov. 13, 2001

(54) SELF-SERVICE CHECK-OUT DEVICE WITH CHECKING OF ARTICLES BEFORE ENABLING SALES PROCESS OF ARTICLES

(75) Inventors: Naoki Ito, Mishima; Jiro Sugiura, Shizuoka-ken; Tsutomu Ikeda, Numazu; Mitsuaki Usui, Shizuoka-ken; Masayuki Kobayashi, Mishima, all of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/351,749

(22) Filed: Dec. 8, 1994

Related U.S. Application Data

(63) Continuation of application No. 07/915,451, filed on Jul. 16, 1992.

(30) Foreign Application Priority Data

| Jul. 19, 1991 | (JP) | 3-179932 |
| Jul. 19, 1991 | (JP) | 3-179933 |
| Aug. 23, 1991 | (JP) | 3-211696 |
| Oct. 14, 1991 | (JP) | 3-264293 |
| Oct. 30, 1991 | (JP) | 3-284930 |
| Dec. 19, 1991 | (JP) | 3-335405 |
| Jan. 7, 1992 | (JP) | 4-000493 |
| Apr. 1, 1992 | (JP) | 4-078109 |

(51) Int. Cl.[7] .................................. G06K 15/00

(52) U.S. Cl. .......................... 235/383; 235/385

(58) Field of Search .................... 235/383, 385; 186/61; 705/23

(56) References Cited

U.S. PATENT DOCUMENTS

| 3,737,631 | * | 6/1973 | Harris .................... 235/383 |
| 3,836,755 | * | 9/1974 | Ehrat .................. 235/462 X |
| 4,236,604 | * | 12/1980 | Warner ................... 186/61 |
| 4,526,244 |   | 7/1985 | Chauveau . |
| 4,656,344 | * | 4/1987 | Mergenthaler et al. ........ 235/462 |
| 4,676,343 | * | 6/1987 | Humble et al. ............... 235/383 |
| 4,679,154 | * | 7/1987 | Blanford ................. 235/462 X |
| 4,716,281 | * | 12/1987 | Amacher et al. .......... 235/383 |
| 4,766,296 | * | 8/1988 | Barth ..................... 235/383 |
| 4,779,706 | * | 10/1988 | Mergenthaler ............. 280/504 |

(List continued on next page.)

FOREIGN PATENT DOCUMENTS

| 899019 | 6/1984 | (BE) . |
| 2009820 | 8/1990 | (CA) . |
| 0 060 702 A2 | 9/1982 | (EP) . |
| 0060702 | 9/1982 | (EP) . |
| 0 120 813 A1 | 10/1984 | (EP) . |
| 0120813 | 10/1984 | (EP) . |
| 0 168 627 A2 | 1/1986 | (EP) . |
| 0484300 | 5/1992 | (EP) . |
| 0 491 348 A2 | 6/1992 | (EP) . |
| 2161631A | * | 1/1986 | (GB) ................. 235/383 |
| WO 87/07416 | 12/1987 | (WO) . |
| WO 88/10480 | 12/1988 | (WO) . |

*Primary Examiner*—Michael G. Lee
*Assistant Examiner*—Jared J. Fureman
(74) *Attorney, Agent, or Firm*—Frishauf, Holtz, Goodman, Langer & Chick, P.C.

(57) ABSTRACT

A check-out device includes a scanner for reading an article code fixed to an article, an entry conveyor for conveying the article after reading the article code, a weigh scale for measuring weight of an article on the entry conveyor to produce measured weight data, a RAM for storing article data of various articles, each article data including an article code and reference weight data, and a processing unit for obtaining from the RAM the reference weight data of the article corresponding to the article code, comparing the obtained reference weight data of an article with the measurement weight data of the same article, and performing a sales processing for the article whose article code is read by the scanner after confirming that the article whose article code is read is the article as is on the conveyor.

16 Claims, 24 Drawing Sheets

U.S. PATENT DOCUMENTS

| | | | |
|---|---|---|---|
| 4,787,467 | * 11/1988 | Johnson | 235/383 |
| 4,792,018 | * 12/1988 | Humble et al. | 235/437 X |
| 4,866,661 | * 9/1989 | de Prins | 235/385 |
| 4,940,116 | * 7/1990 | O'Connor et al. | 186/61 |
| 4,964,053 | * 10/1990 | Humble | 235/383 |
| 5,008,518 | * 4/1991 | Taussig et al. | 186/61 X |
| 5,046,570 | 9/1991 | Emme et al. . | |
| 5,125,465 | * 6/1992 | Schneider | 186/61 X |
| 5,139,100 | * 8/1992 | Braunneis | 235/383 |
| 5,168,961 | * 12/1992 | Schneider | 186/61 X |
| 5,191,749 | 3/1993 | Cappi et al. . | |
| 5,343,025 | * 8/1994 | Usui | 235/383 |

* cited by examiner

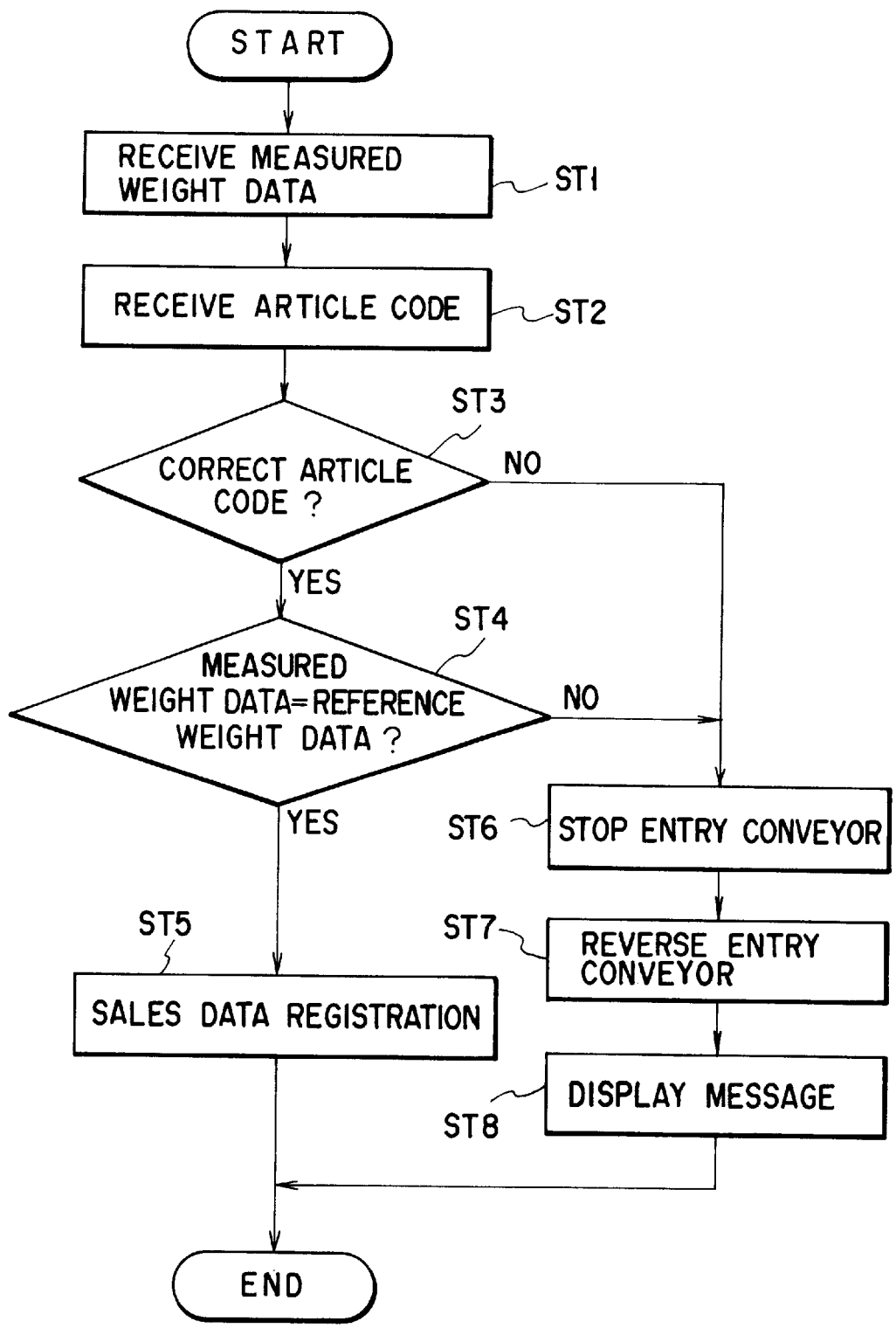
F I G. 2

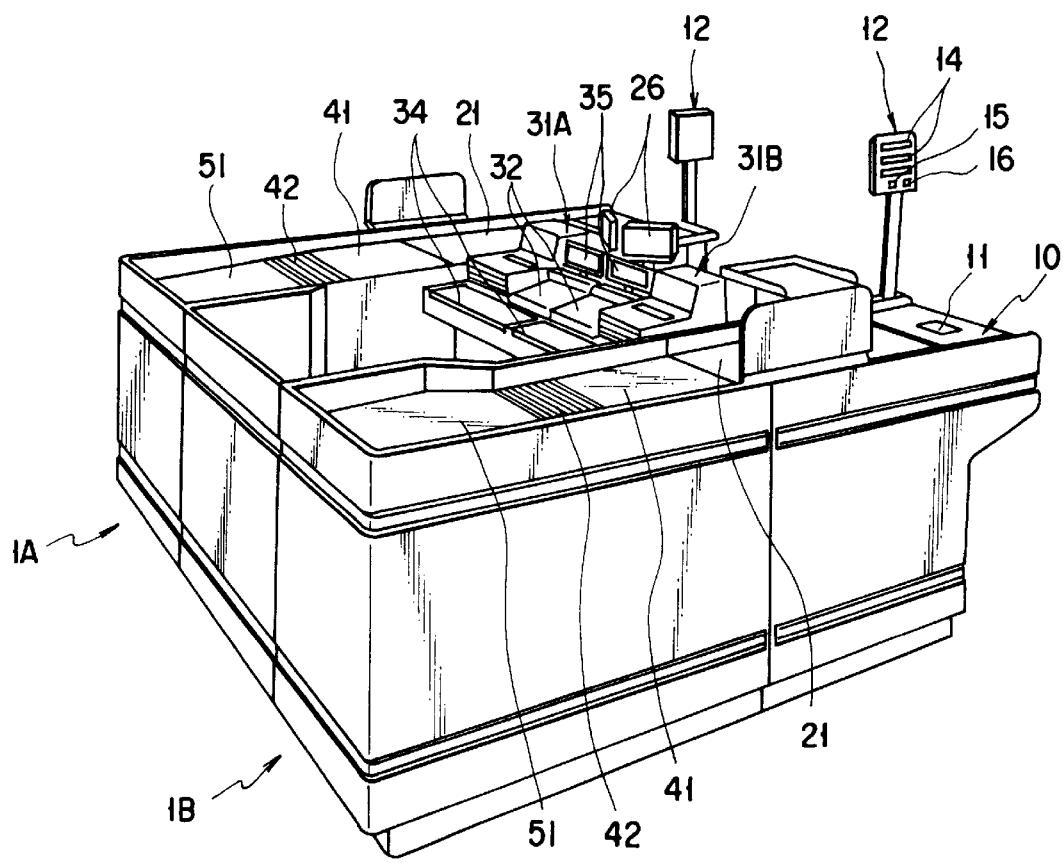
F I G. 3

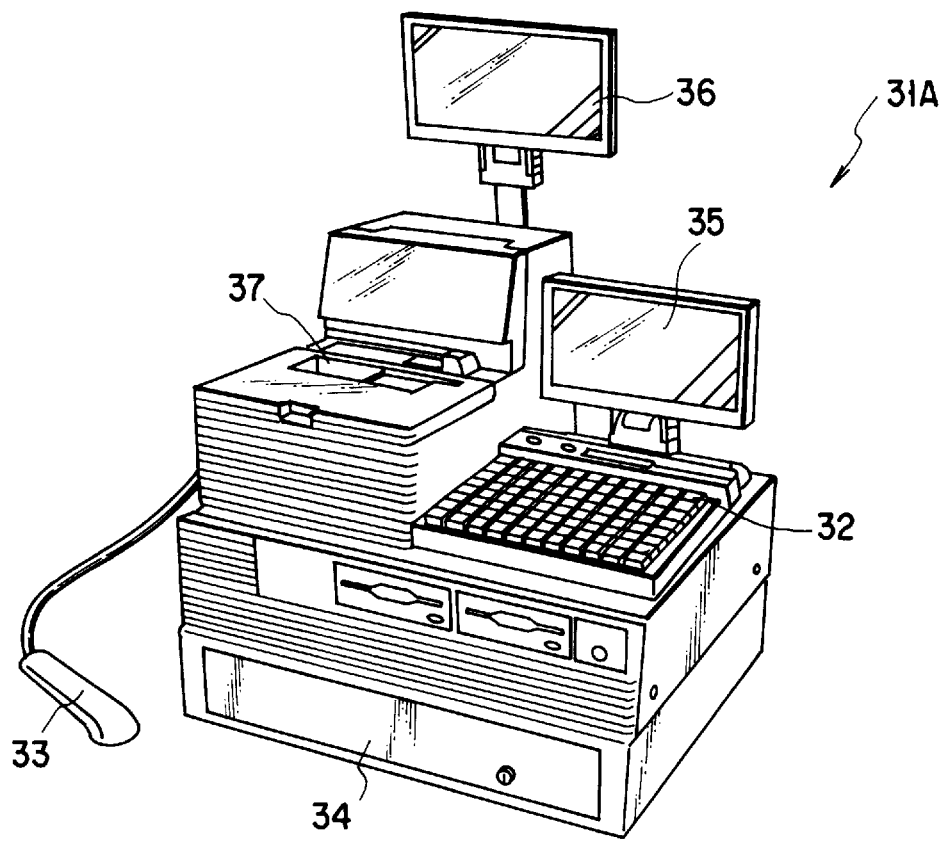
F I G. 6
F I G. 7

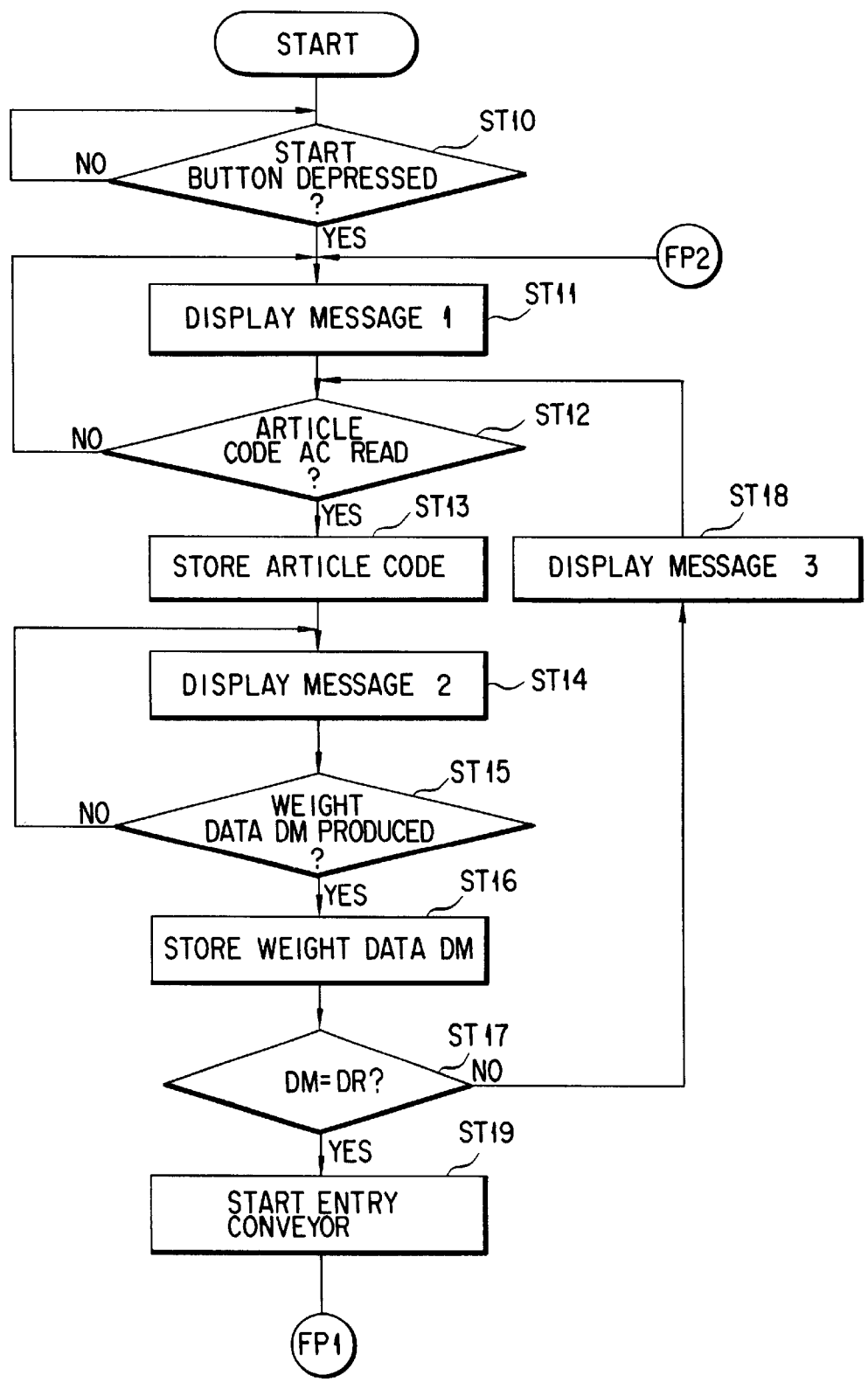
F I G. 8

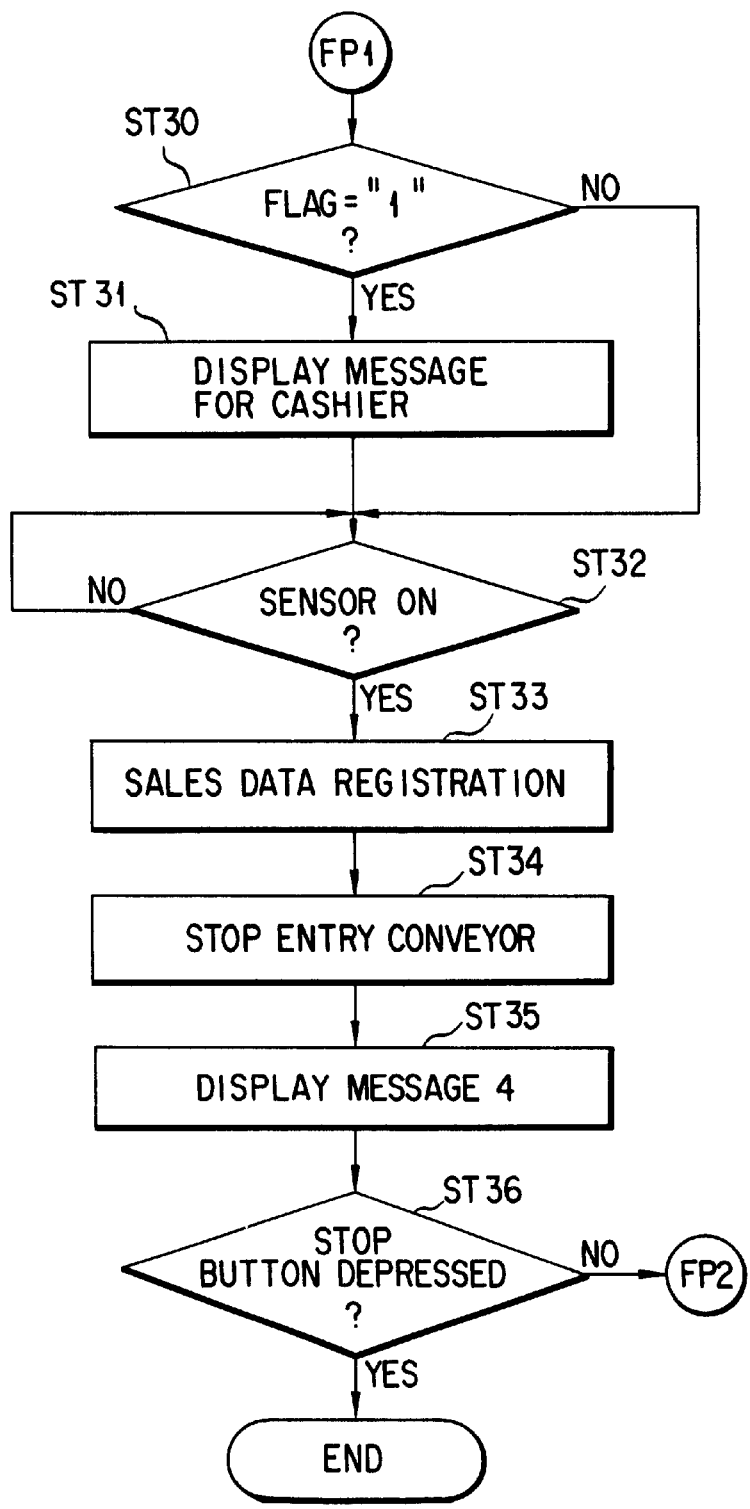
F I G. 11

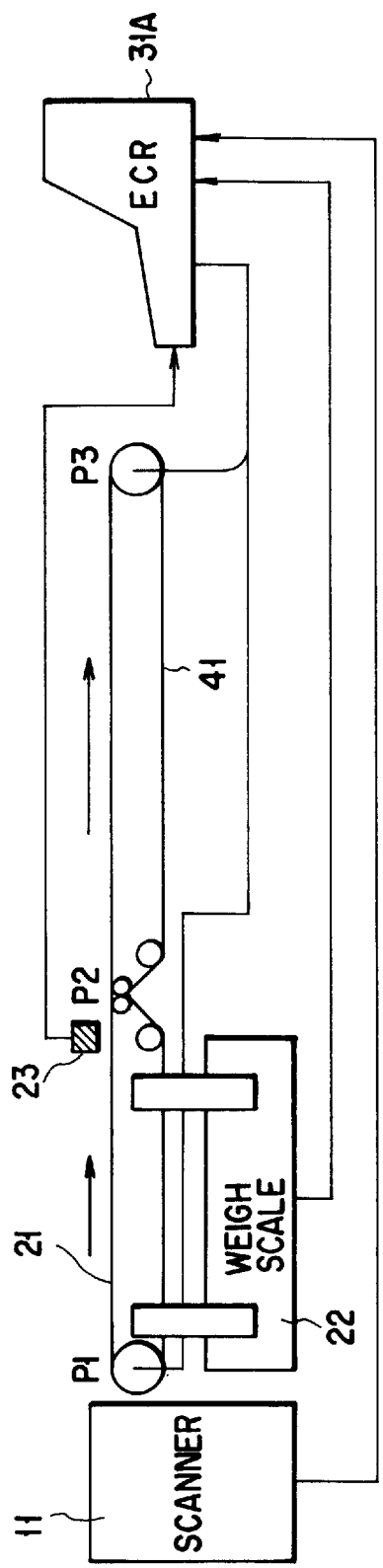
F I G. 12A
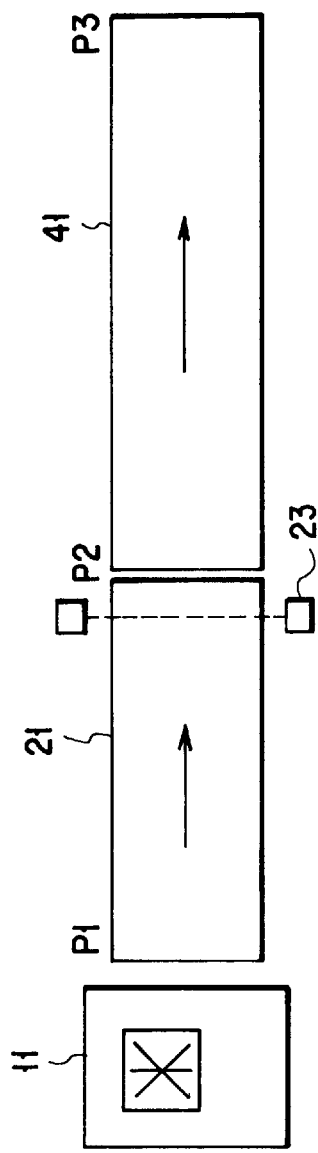
F I G. 12B

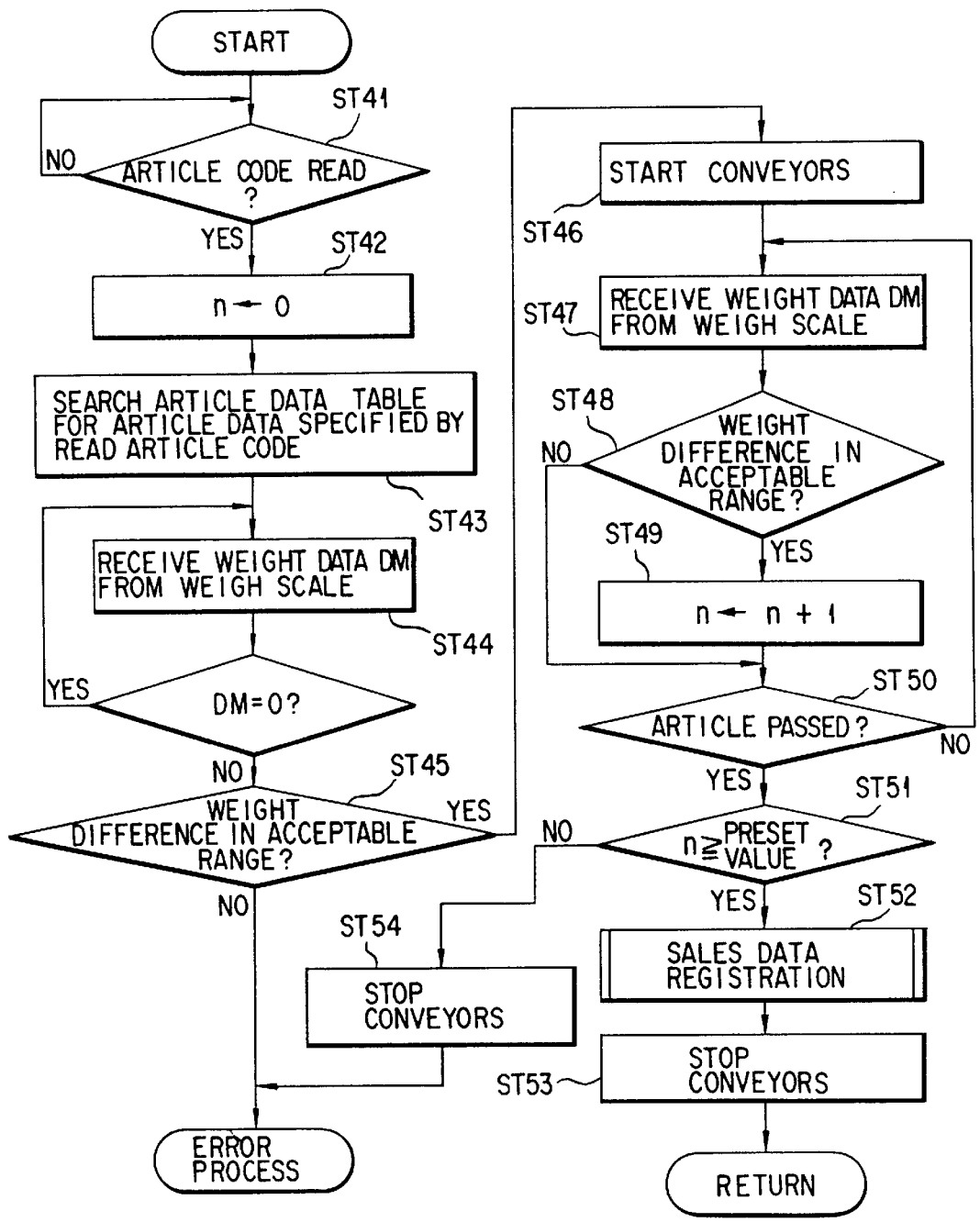
F I G. 14

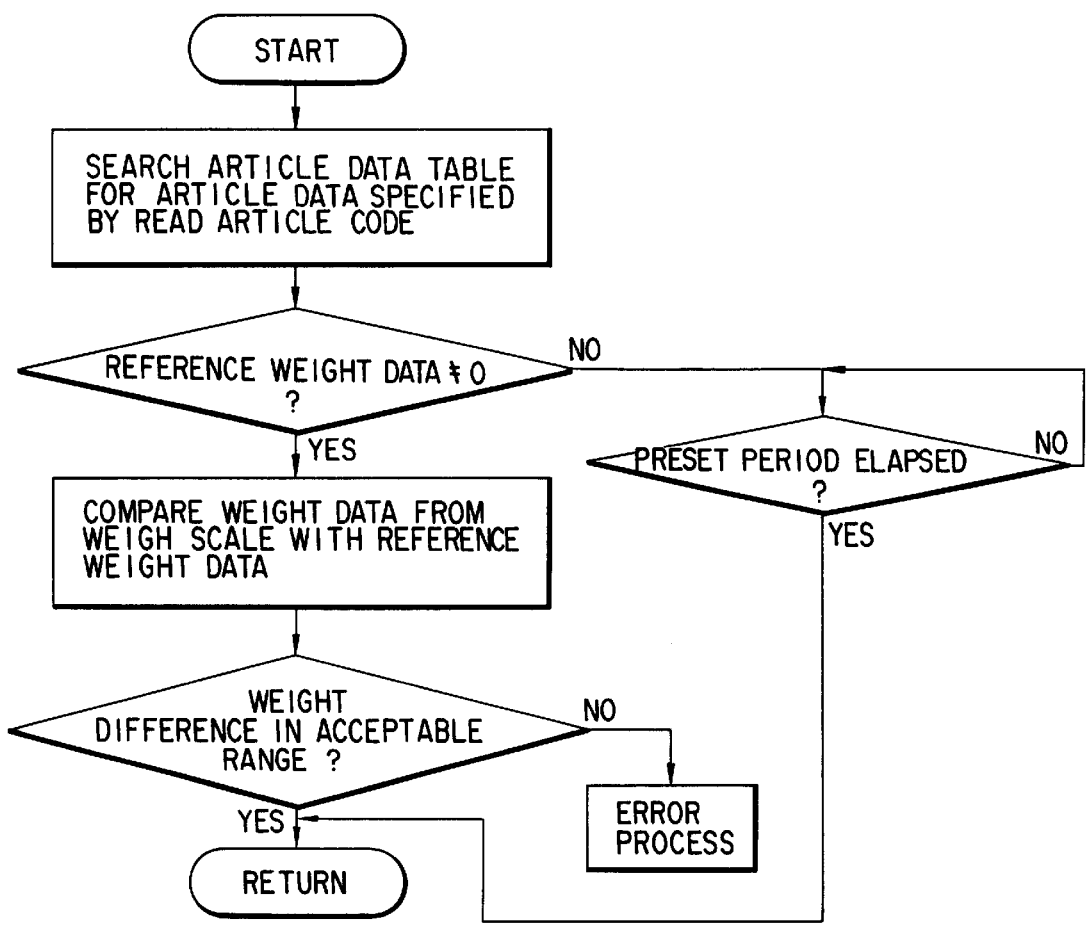
F I G. 15

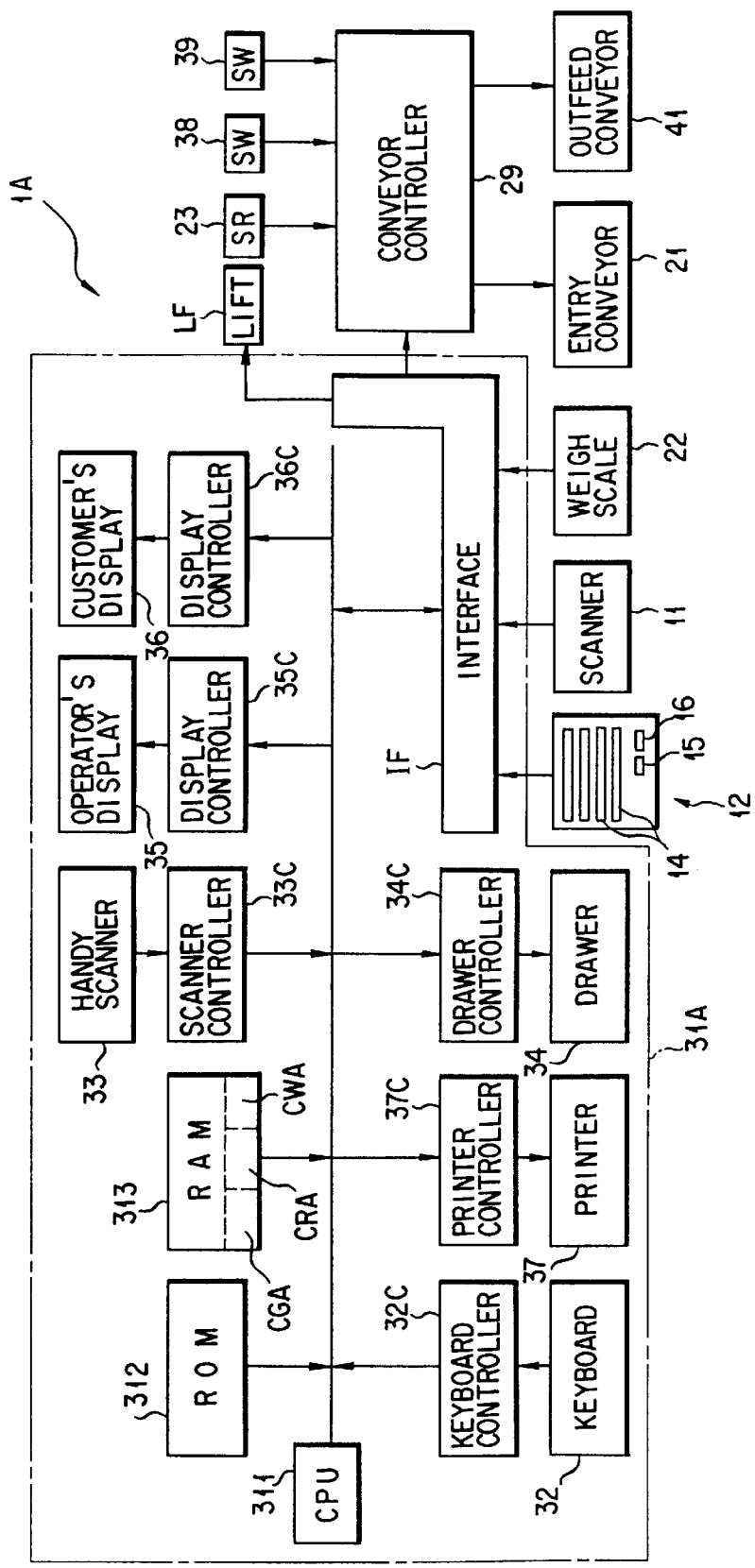
F I G. 18

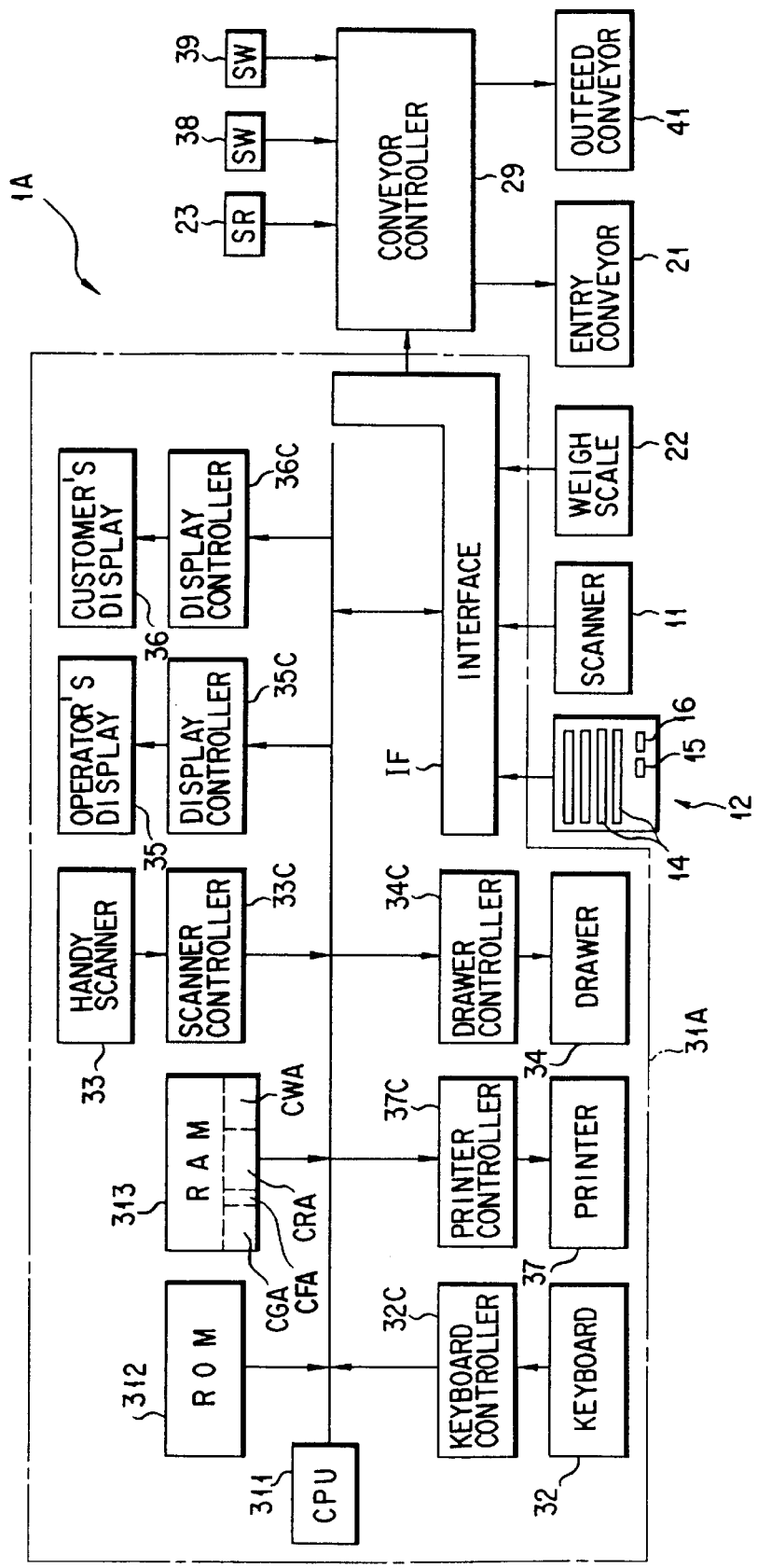
F I G. 20

|  | CGA | | | CFA |
|---|---|---|---|---|
| ARTICLE CODE | ARTICLE NAME | UNIT PRICE | REFERENCE WEIGHT | INHIBIT FLAG |
| 01 | A | 1000 | 1000g | |
| 02 | B | 1100 | 100 | 1 |
| 03 | C | 500 | 600 | |
| 04 | D | 1500 | 500 | |
| 05 | E | 4000 | 1000 | 1 |
| | | | | |

F I G. 21

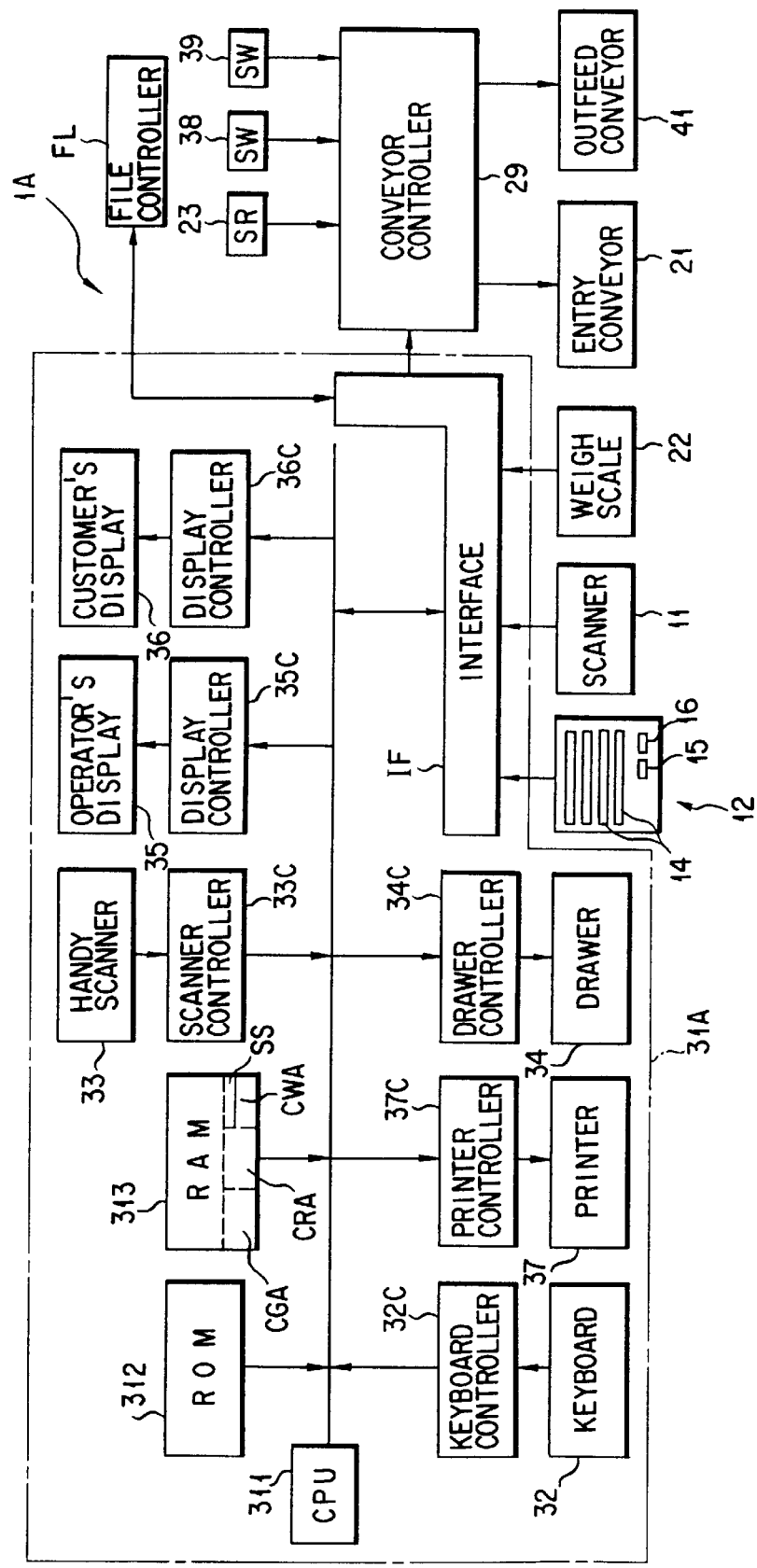
F I G. 23

| CONVEYOR SPEED | ARTICLE CODE |
|---|---|
| V1 | 001~020 |
| V2 | 021~150 |
| V3 | 151~170 |

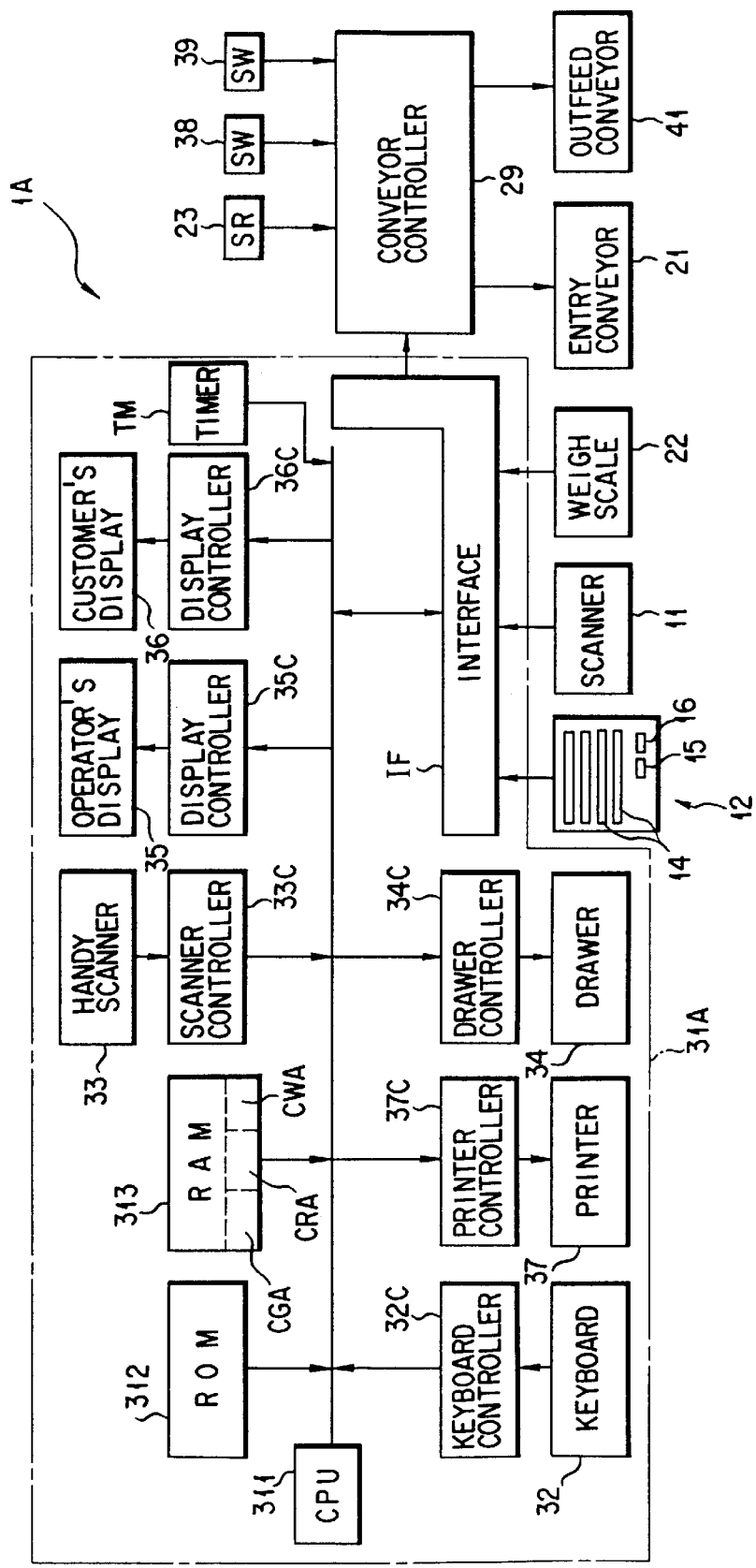
F I G. 28

SELF-SERVICE CHECK-OUT DEVICE WITH CHECKING OF ARTICLES BEFORE ENABLING SALES PROCESS OF ARTICLES

This application is a continuation, of application Ser. No. 07/915,451, filed Jul. 16, 1992.

BACKGROUND OF THE INVENTION

1. Field of the Invention

The present invention relates to a check-out device for reading an article code recorded on an article in a machine readable form, and performing registration of sold articles on the basis of the read article code and, more particularly, to a check-out device wherein a customer takes part in reading of an article code.

2. Description of the Related Art

FIG. 1 shows a conventional check-out device which is equipped as a self-service check-out counter in, e.g., a supermarket. A customer CSR puts articles he or she wants to purchase in a shopping cart, carries them to this counter, and depresses a start button on an operation panel 12 so as to start registration of the articles. Thereafter, the customer CSR picks up each of the articles from the cart, and sets the article in front of an article code reader or scanner 11 to input an article code affixed thereto by means of a scanning operation of the scanner 11, and puts the read article on an entry conveyor 21 provided over an electronic weigh scale 22. The scanner 11 optically scans the article to read the article code thereof, and supplies the read article code to an electronic cash register 31. The electronic weigh scale 22 measures the weight of the article put on the entry conveyor 21, and supplies a result of the measurement as measured weight data to the electronic cash register 31. The cash register 31 has an article data table containing article data of all the articles for sale, each of which is constituted by an article code, article name data, price data, and reference weight data, for example. The electronic cash register uses the read article code, the measured weight data, and the article data table to determine that the article whose article code is read by the scanner 11 is certainly put on the entry conveyor 21, and also uses the read article code to register the article as a sold article after the determination. On the other hand, the article is fed from the entry conveyor 21 to an outfeed conveyor 41 after the determination, and further fed to a bagging area by means of the outfeed conveyor 41 and an inclined chute 42. After scanning of all the articles to be purchased, the customer CSR depresses a stop button to finish the article registration. When the article registration is finished, the electronic cash register 31 performs settlement for the sold articles on the basis of the article data stored in the article data table. A cashier CHR informs the total amount of the sold articles obtained in the settlement to the customer CSR, and stores the cash paid by the customer CSR in a drawer of the cash register 31. After the payment, the customer puts the articles stocked on a bagging area 51 into a bag, and brings them home.

FIG. 2 shows the operation of the cash register 31, which operation is performed every time the scale 22 measures the weight of an article. In this operation, in step ST1, the cash register 31 receives the measured weight data supplied from the scale 22. In step ST2, the cash register 31 receives output data from the scanner 11 as an article code. It is then checked in step ST3 if the article code is correct. If YES in step ST3, the measured weight data is compared with reference weight data of an article specified by the received article code in step ST4. If the two weight data coincide with each other, article data of the specified article is registered as a sold article using the received article code in step ST5. The entry conveyor 21 often receives an article whose article code cannot be normally read by the scanner 11, an article whose article code is not input by a customer, or an article other than an article whose article code is read. In this. case, the cash register 31 stops the entry conveyor 21 in step ST6, drives the entry conveyor 21 in the reverse direction to return the article to the customer in step ST7, and then causes the operation panel 12 to display a message for urging the customer to re-input the article code of the returned article in step ST8.

In the above-mentioned check-out device, the customer performs an input job of an article code using the scanner 11, and the cashier performs a settlement job for the customer who completes the input job of the article code. For this reason, the customer does not wait for the end of jobs of the cashier without doing anything, and the load on the cashier can be reduced. In addition, since the scanner 11 is utilized, an input error of an article code caused by a key operation error can be prevented. As a result, customers can be prevented from forming a long queue at a check-out counter. Furthermore, whether or not the article whose article code is read is the same as that on the entry conveyor 21 can be checked by comparing the weight data, thereby preventing a dishonest practice of a customer. Published Unexamined Japanese Patent Application No. 61-46591 and Published Examined Japanese Patent Application No. 1-52794 disclose systems similar to the above-mentioned check-out device.

However, this check-out device has not become so popular for various reasons.

1) The entry conveyor 21 is continuously operated to attain a quick check-out job. This means a waste of electric power in a non-busy hour. Since the entry conveyor 21 is always in sliding contact with the electronic scale 22, its service life expires in relatively a short period of time. As for the electronic scale 22, it must have a complex structure for precisely measuring the weight of an article put on the entry conveyor 21 regardless of the position of the article. This increases the manufacturing cost of the check-out device. Furthermore, this check-out device drives the entry conveyor 21 in the reverse direction when a non-coincidence of the weight of an article is detected. This results in not only an increase in manufacturing cost due to complicated control, but also disturbance against a quick check-out job. The entry conveyor 21 is driven in the reverse direction even when the non-coincidence of the weight of an article is detected upon, e.g., falling down of an article. In this case, an honest customer may have an unpleasant experience.

2) In the above-mentioned check-out device, since the electronic scale 22 is in sliding contact with the entry conveyor 21, a weight difference, with which the electronic scale 22 can identify articles with high precision, is limited. For example, articles such as bottled wines are sold to have a wide variety of stocks from inexpensive ones to expensive ones. However, since such articles do not have a difference in total weight, the following dishonest practice may occur. That is, the article code of an inexpensive wine is read by the scanner 11, and an expensive wine having substantially the same weight as that of the inexpensive wide is put on the entry conveyor 21. The conventional check-out device cannot detect the non-coincidence of the weight data items of the article in this case, and causes a loss on the side of the shop. In order to prevent such a dishonest practice, a cashier must monitor a customer's job. For example, when two readers 11 are arranged for a cashier, they impose a heavy load on the cashier.

3) During conveyance of an article, it may be replaced with another article. This replacement may be prevented by arranging a tunnel for enclosing a convey path. However, this countermeasure requires an installation space for the tunnel, and increases the manufacturing cost upon an increase in equipment scale.

4) The article data table in the cash register must contain reference weight data of all the articles for sale. However, a job for inputting the reference weight data requires relatively much time and labor.

5) In some supermarkets, a customer is instructed to carry an article returned by the entry conveyor 21 to a cashier, and the cashier registers the returned article. When many articles are returned, the customer must use a cart or basket to carry them. In this case, it may take time for him or her to put them into the cart or basket, or he or she may drop the article. Even if the cashier is allowed to drive the conveyors 21 and 41, it may similarly take time for the cashier to put many articles on the entry conveyor 21, or he or she may drop the article. As a result, a quick check-out job is disturbed.

6) The above-mentioned check-out device may accept restricted articles such as cigarettes and liquors which must not be sold to minors, and rod-shaped or wet articles which are not suitable for conveyance. Therefore, a cashier must check whether a customer wishes to purchase such article.

7) The conveyor speed must be preset as high as possible in order to shorten the required time for checking out. However, the preset speed can not cope with an increase in sales articles. For example, an unsteady glass product is easily fallen down and broken or cracked during conveyance. If the glass product is a vessel for receiving liquid, the liquid will be leaked from the vessel at this time. Further, the weigh scale 22 cannot weigh all the articles constantly with high precision when they are conveyed at a high speed. In other words, the weighing results of some articles are not reliable due to the characteristic of the scale 22.

8) The zero-point setting of the scale 22 is performed when the power of the check-out device is applied. At this time, if an empty basket is on the entry conveyor 21, the scale 22 is set at a wrong zero point according to the load weight thereof.

SUMMARY OF THE INVENTION

It is an object of the present invention to provide a check-out device which can popularize a self-service check-out device.

In order to achieve the above object, there is provided a check-out device which comprises a reading section for reading an article code affixed to an article, a conveyor section for conveying an article put thereon after the reading of an article code, a weighing section for measuring the weight of the article put on the conveying section to produce measured weight data, a memory section for storing article data of various articles each of which data contains an article code and reference weight data, a processing section for reading, from the memory section, reference weight data of an article corresponding to the article code read by the reading section, comparing the reference weight data with the measured weight data from the weighing section, and performing a sales processing on the article whose article code is read by the reading section after it is identified with the article put on the conveyor section based on the comparison result, and the processing section includes a conveyance control section for permitting the operation of the conveyor section after the articles are identified with each other.

According to the check-out device, the conveyor section is not continuously operated. Therefore, electric power can be prevented from being wasted in a non-busy hour. Since the conveying section need not be always in sliding contact with the weighing section, its service life expires in relatively a long period of time. As for the weighing section, it needs not to have a complex structure for precisely measuring the weight of an article put on the conveyor section regardless of the position of the article. Further, the conveyor section need not be driven in the reverse direction when the article whose article code is read is not identified with the article put on the conveyor section. Therefore, the manufacturing cost of the check-out device can be reduced. In addition, an honest customer will not have an unpleasant experience even if an article put on the conveyor section falls down, since the article is not conveyed before the weight thereof is correctly measured by the weighing section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flowchart for explaining the operation of the electronic cash register shown in FIG. 1;

FIG. 3 is a perspective view of a check-out device according to a first embodiment of the present invention;

FIG. 6 is a view showing the construction of an electronic cash register shown in FIG. 3 in more detail;

FIG. 7 is a memory map of an article data file stored in a RAM shown in FIG. 5;

FIGS. 8 and 9 are flowcharts for explaining the operation of the check-out device;

FIG. 10 is a memory map of an article data file stored in a RAM used in a check-out device according to a second embodiment of the present invention;

FIG. 11 is a flowchart for explaining the operation of the check-out device of the second embodiment;

FIG. 12A is a cross-sectional view of a check-out device according to a third embodiment of the present invention;

FIG. 12B is a plan view of an article convey path of the check-out device of the third embodiment;

FIG. 14 is a flowchart for explaining the operation of the check-out device of the third embodiment;

FIG. 15 is a flowchart for explaining the operation of a check-out device according to a fourth embodiment of the present invention;

FIG. 18 is a block diagram showing the control circuit of the check-out device shown in FIG. 16;

FIG. 20 is a block diagram showing the control circuit of a check-out device according to a sixth embodiment of the present invention;

FIG. 21 is a memory map of part of a RAM shown in FIG. 20;

FIG. 23 is a block diagram showing the control circuit of a check-out device according to a seventh embodiment of the present invention;

FIG. 28 is a block diagram showing the control circuit of a check-out device according to an eighth embodiment of the present invention;

DETAILED DESCRIPTION OF THE PREFERRED EMBODIMENTS

A check-out device according to a first embodiment of the present invention will now be described with reference to FIG. 3 to FIG. 9. This check-out device is equipped as a self-service check-out counter in a supermarket, for example.

Figure 1:
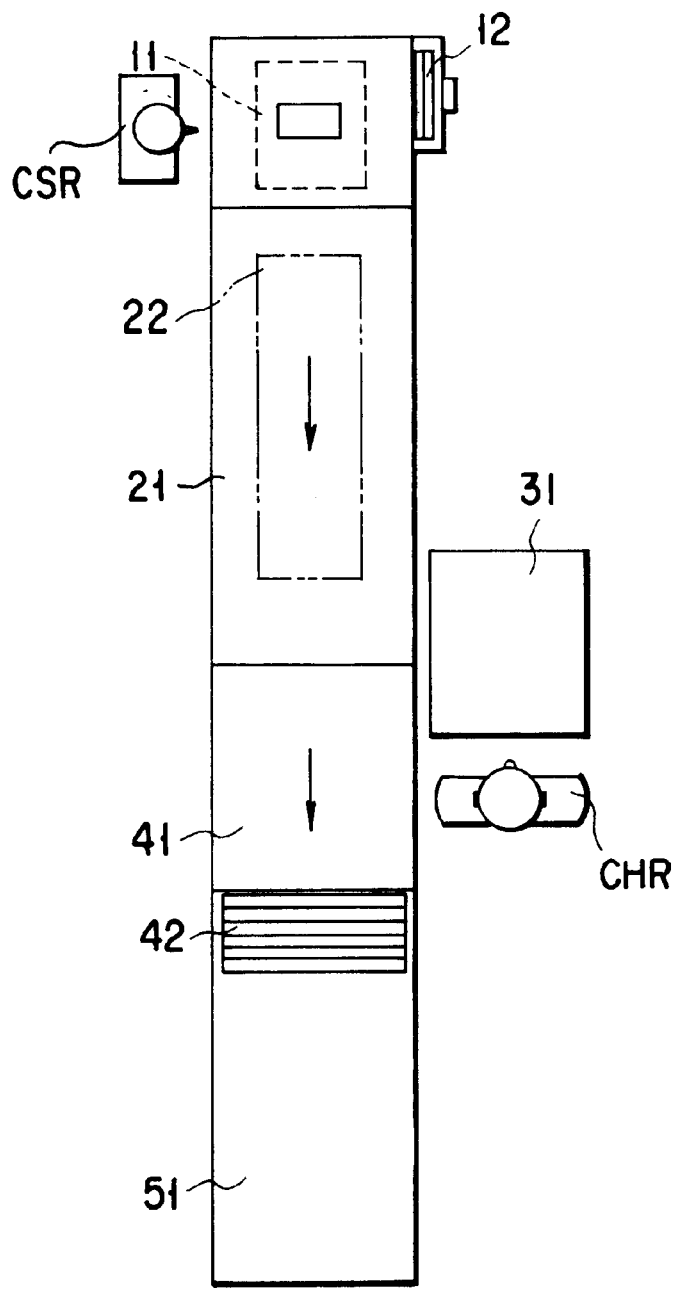
FIG. 1 is a plan view of a conventional check-out device equipped in a supermarket as a self-service check-out counter.
Figure 4:
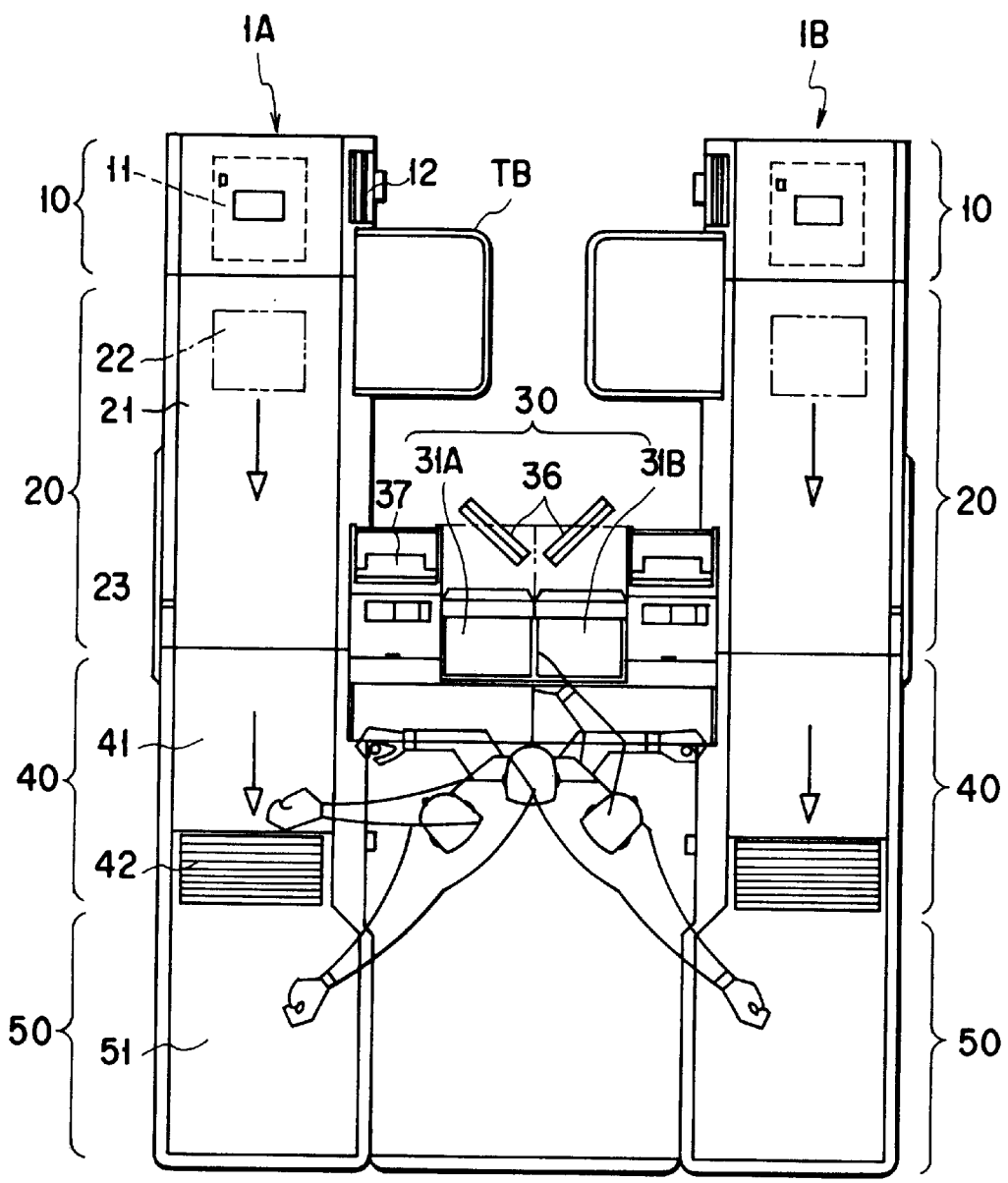
FIG. 4 is a plan view of the check-out device shown in FIG. 3.
Figure 5:
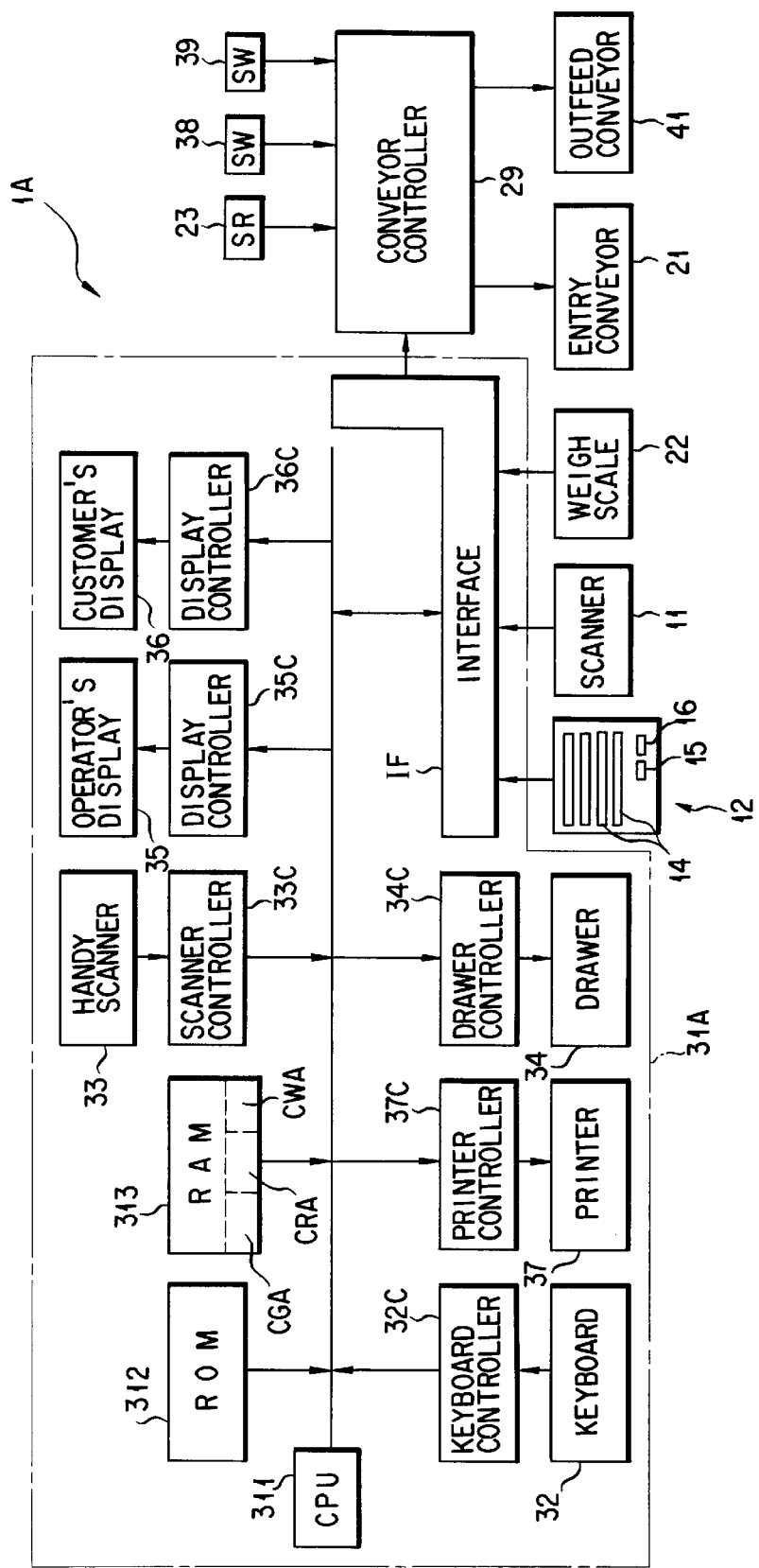
FIG. 5 is a block diagram showing the control circuit of the check-out device shown in FIG. 3.

FIG. 3 is a perspective view of the check-out device, FIG. 4 is a plan view of the check-out device, and FIG. 5 is a view showing the construction of the control circuit of the check-device. The check-out device comprises a pair of check-out lanes 1A and 1B arranged in parallel. Each of the check-out lanes is constituted by an input section 10, an entry section 20, an outfeed section 40, a stock section 50. The check-out device further comprises a settlement section 30 arranged between the check-out lanes 1A and 1B. The input section 10 includes a stationary scanner 11 for optically scanning an article to read an article code recorded thereon in a bar code form, an operation panel 12 to be used by a customer CSR, a shelf TB for temporarily stocking articles which the stationary scanner 11 has failed to read their article codes. The operation panel 12 includes a start button 15 for instructing a start of article registration, a stop button 16 for instructing a stop of the article registration, and a display 14 for displaying a message for the customer CSR. The entry section 20 includes an entry conveyor for conveying an article whose article code is read by the scanner 11, an electronic weigh scale 22 for measuring the weight of the article on the entry conveyor to produce measured weight data representing a result of measurement, and an article sensor 23 for optically sensing an article passing though an exit portion of the entry conveyor 21. The weigh scale 22 is arranged to be vertically movable under an entrance portion of the entry conveyor 21. The weigh scale 22 is kept at a lower position when the entry conveyor 21 is operated, and at an upper position when the operation of the entry conveyor 21 is stopped. The weight of an article is automatically measured in the state where the weigh scale 22 is set at the upper position and in contact with the entry conveyor 21. The article sensor 23 is arranged near the exit of the entry conveyor 21 and made of a photosensor of a light reflection type, for example. The outfeed section 40 includes an outfeed conveyor 41 for conveying an article supplied from the entry conveyor 21, and an inclined chute 42 for supplying an article supplied from the outfeed conveyor 41 to a bagging area 51 of a stock section 50. The settlement section 30 includes electronic cash registers 31A and 31B respectively arranged on the sides of the check-out lanes 1A and 1B and having the same construction. Each of the cash registers 31A and 31B is connected to the scanner 11 and the weigh scale 22 which are provided in a corresponding check-out lane 1A or 1B. These cash registers 31A and 31B are operated by one cashier CHR. The settlement section 30 further includes first and second conveyor controllers 29, first and second foot switches 38, and first and second emergency switches 39. the first and second conveyor controllers 29 control article conveyance in the check-out lanes 1A and 1B. The first and second foot switches 38 are used to start the entry conveyors 21 of the check-out lanes 1A and 1B, and the first and second emergency switches 39 are used to stop the entry conveyors 21 of the check-out lanes 1A and 1B. The positions of the switches 38 and 39 are determined so that the cashier CHR can use them. The first conveyor controller 29 operates based on a control signal from the cash register 31A, and control signals from the article sensor 23, the foot switch 38, and the emergency switch 39 of the check-out lane 1A. The second conveyor controller 29 operates based on a control signal from the cash register 31B, and control signals from the article sensor 23, the foot switch 38, and the emergency switch 39 of the check-out lane 1B. In each of the check-out lanes 1A and 1B, internal motors of the conveyors 21 and 41 starts and stops by the control of a corresponding conveyor controller 29. Normally, the entry conveyor 21 starts when an article whose article code is read by the scanner 11 is identified with that put on the entry conveyor 21, and stops when the article put on the entry conveyor passes the article sensor 23. On the other hand, the outfeed conveyor 41 starts when a customer CSR begins registration of articles (or input of article codes), and stops when the article registration is completed.

The check-out procedure will be briefly described hereinafter.

Articles to be purchased are put in a shopping cart and carried to one of the check-out lanes 1A and 1B, for example, the check-out lane 1B. A customer CSR depresses a start button on an operation panel 12 so as to start registration of the articles. Thereafter, the customer CSR picks up each of the articles from the cart, and sets the article in front of the scanner 11 to input an article code affixed thereto by means of a scanning operation of the scanner 11, and puts the read article on the entry conveyor 21 provided over an electronic weigh scale 22. The scanner 11 optically scans the article to read the article code thereof, and supplies the read article code to the electronic cash register 31A. The electronic weigh scale 22 measures the weight of the article put on the entry conveyor 21, and supplies a result of the measurement as measured weight data to the electronic cash register 31A. The cash register 31A determines on the basis of the read article code and the measured weight data that the article whose article code is read is certainly put on the entry conveyor 21, and registers the article as a sales article by using the read article code. On the other hand, the article is moved to the bagging area 51 by means of the entry conveyor 21, the outfeed conveyor 41, and inclined chute 42. After scanning of all the articles to be purchased, the customer CSR depresses a stop button to finish the article registration. When the article registration is finished, the electronic cash register 31 performs settlement for the sales articles on the basis of the article data stored in the article data table. A cashier CHR informs the total amount of the sold articles obtained in the settlement to the customer CSR, and stores the cash paid by the customer CSR in a drawer of the cash register 31. After the payment, the customer puts the articles stocked on a bagging area 51 into a bag, and brings them home.

In a sales processing such as article registration and settlement mentioned above, each of the electronic cash registers 31A and 31B controls the conveyor controller 29, the weigh scale 22, the scanner 11, and the operation panel 12. The construction of the electronic cash register 31A will now be described more in detail. However, a description of the electric cash register 31B is omitted since this cash register has the same construction as the cash register 31A.

As shown in FIG. 5, the electronic cash register 31A comprises a keyboard 32, a handy scanner 33, a drawer 34, an operator display 35, a customer display 36, and a printer 37. The keyboard 32 and the handy scanner 33 are used by a cashier CHR to input the article code of an article which the scanner 11 has failed to read the article codes therefrom. The keyboard 32 includes a ten-key pad, a close key, a cancel key, a discount key, and the like. The displays 35 and 36 display article data of each sales article and total sales amount. The drawer 34 stores the cash paid by the customer CSR. The printer 37 issues a receipt on which sales article names, sales prices, a total sales amount, and the like are printed. The electronic cash register 31A further comprises a CPU 311, a ROM 312, a RAM 313, an interface IF, a keyboard controller 32C, a scanner controller 33C, a drawer controller 34C, display controllers 35C and 36C, and a printer controller 37C which are interconnected by means of a bus line as shown in FIG. 5. The CPU 311 performs various data processings to totally control the operations of the cash register 31A and check-out lane 1A. The cash register 31A is operable in one of a setting mode, a registration mode, an inspection mode, and a settlement mode by the control of the CPU 311. The afore-mentioned sales processing is performed during the operation in the registration mode. The CPU 311 is connected to the keyboard 32, the handy scanner 33, the drawer 34, the operator display 35, the customer display 36, and the printer 37 via the controllers 32, 33C, 34C, 35C, 36C, and 37C, respectively. The CPU 311 is further connected to the operation panel 12, the scanner 11, the weigh scale 22, and the conveyor controller 29 via the interface IF. The interface IF is constructed to have a circuit capable of performing a data communication with an external computer (not shown) and a magnetic disk driver. The ROM 312 stores a control program for the CPU 311, and fixed data such as printing fonts, display fonts, and the like. The RAM 313 stores various data input to and output from the CPU 311. More specifically, the RAM 313 has a storage area CGA for storing an article data table which contains article data of all the articles for sale, a storage area CRA for storing an sales data table which contains sales data of all the articles for sale, and a storage area CWA for storing work data such as a read article code, measured weight data, and article data of an article corresponding to the read article code. Each article data is constituted by items of data representing an article code, an article name, unit price, and reference weight, and each sales data is constituted by items of data representing the number of sales articles and a sales amount. The article data table is supplied from the external computer or the magnetic disk driver, and set in the storage area CGA of the RAM 313.

The operation of the check-out device will now be described with reference to FIGS. 8 and 9.

A customer who puts a large number of articles he or she wants to purchase in a cart stops at the input section 10, and depresses the start button 15. When the operation of the button 15 is detected in step ST10, the CPU 311 then causes the display 14 to display a message 1 of "PLEASE SCAN ARTICLE" in step ST11. When the customer set an article in front of the scanner 11, the article code AC of this article is read by the scanner 11, and supplied to the cash register 31. The CPU 311 checks in step ST10 whether an article code is received, and stores the received article code in the storage area CWA of the RAM 313. At this time, the CPU 311 reads out reference weight data of an article corresponding to the article code AC from the article data table stored in the storage area CGA of the RAM 313, and temporarily stores the readout data in the storage area CWA. In step ST14, the display 14 displays a message 2 of "PLEASE PUT THIS ARTICLE ON ENTRY CONVEYOR". The weigh scale 22 measures the weight of the article put on the entry conveyor 21, and supplies a result of the measurement as measured weight data DM to the cash register 31A. When it is detected in step ST15 that the measured weight data DM is obtained, the weight data DM is temporarily stored in the storage area CWA of the RAM 313. In step ST17, this measured weight data DM is compared with the reference weight data DR contained in the article data stored in the storage area CWA. If it is detected that DM is close to DR, the CPU 311 identifies the article whose article code is read with the article put on the entry conveyor 21, and supplies in step ST17 a drive start instruction to the conveyor controller 29 so as to start the operation of the entry conveyor 21.

If it is detected that DM is not close to DR, the CPU 311 causes the display 14 to display a message 3 of "PLEASE REMOVE THIS ARTICLE FROM ENTRY CONVEYOR AND SCAN IT AGAIN" in step ST18. In this case, the entry conveyor 21 stands still without being operated, and the step ST12 is executed again.

If it is determined in step ST17 that the article whose article code is read is the same as the article put on the entry conveyor 21, the article on the entry conveyor 21 is conveyed towards the outfeed conveyor 41.

In step 20, it is checked whether the article is sensed by the article sensor 23. When the article is sensed, the CPU 311 registers the article as a sales article by using the read article code, and updates the sales data table based on the article data corresponding to the read article code. The CPU 311 controls in step ST22 the conveyor controller 29 to stop the entry conveyor 21. In step ST23, the CPU 311 causes the display 14 to display a message 4 of "PLEASE SCAN THE NEXT ARTICLE OR DEPRESS STOP BUTTON." The next article is handled in the same manner as described above.

The stop button 16 is depressed after scanning of all the articles. When the operation of the stop button 16 is detected in step ST24, the article registration is ended.

The cashier inputs a settlement instruction by using the close key when the customer who has completed the registration of articles comes. The CPU 311 responds to the instruction, settles the registered articles based on the article data thereof, causes the display 36 to display a total sales amount and the like obtained as a result of the settlement. The customer visually checks the display 36 to pay the total sales amount. If the shelf TB has articles put thereon since the scanner 11 has failed to read the article code therefrom, the customer carries these articles to the settlement section and hands them to the cashier. The cashier inputs their article codes by using the keyboard 32 or the handy scanner 33. After the payment, the customer bags the articles stocked in the bagging area.

According to the check-out device of this embodiment, since the conveyors 21 and 41 are not driven at all times, the electric power consumed by the checkour device can be reduced. Further, the article put on the entry conveyor 21 is not conveyed before it is identified with the article whose article code is read by the scanner 11. Therefore, it is not necessary to drive the conveyor 21 in the reverse direction when these articles are not identified with each other. As a result, the construction of the entry conveyor 21 can be made simple, thereby lowering the manufacturing cost of the check-out device. Further, scanning of succeeding articles is not delayed since the preceding article is not returned to the customer by the entry conveyor 21. If the article on the entry conveyor 21 falls down, an error may occur in the weighing of the article. However, since the entry conveyor 21 is not driven in the reverse direction in this case, the customer will not have an unpleasant experience. The weigh scale 22 is used while the entry conveyor 21 is not driven and kept in a standstill state. Since the weighing is effected in such a stable condition, even if a compact weigh scale is used, the scale can have accuracy which does not fail to distinguish articles having a small difference in weight. Further, the electronic cash register 31A has the CPU 311, the ROM 312, and the RAM 313 which are used not only for the control of a sales processing such as article registration and settlement, but also for the control of article conveyance. Therefore, it is possible to expect a high-speed control with a simple conveyor controller 29.

In the check-out device described above, the settlement section 30 is arranged such that the electronic cash registers 31A and 31B are operated by one cashier. However, the settlement section can be arranged such that the cash registers 31A and 31B are operated by two cashiers.

A check-out device according to a second embodiment of the present invention will now be described with reference to FIG. 10 and FIG. 11.

This check-out device has basically the same construction as that of the first embodiment except for the following point. That is, the check-out device calls for the cashier's attention when there is a possibility that an article which is scanned to read the article code thereof is replaced by another article having the same weight as the scanned article but a different price from the scanned article. In this embodiment, the same reference numerals denote the same or common portions as in the first embodiment, and a description thereof will be made briefly or omitted.

In this embodiment, each article data in the article data table is constituted by items of data representing an article code, an article name, unit price, reference weight, and attention request flag. The attention request flag is used to indicate the existence of a non-identifiable article having the same weight but a different price in the article data table. For example, the attention request flag "1" is set to the article data of an article A having a price of 1,000 yen and a weight of 1,000 g, and the article data of an article E having a price of 4,000 yen and a weight of 1,000 g. In addition, if an article is the most expensive of all the non-identifiable articles, it would not be replaced by another article. Therefore, it is not necessary to set the attention request flag "1" to the most expensive article. In FIG. 10, (1) denotes an article which does not require the attention request flag "1".

Figures 9, 10:
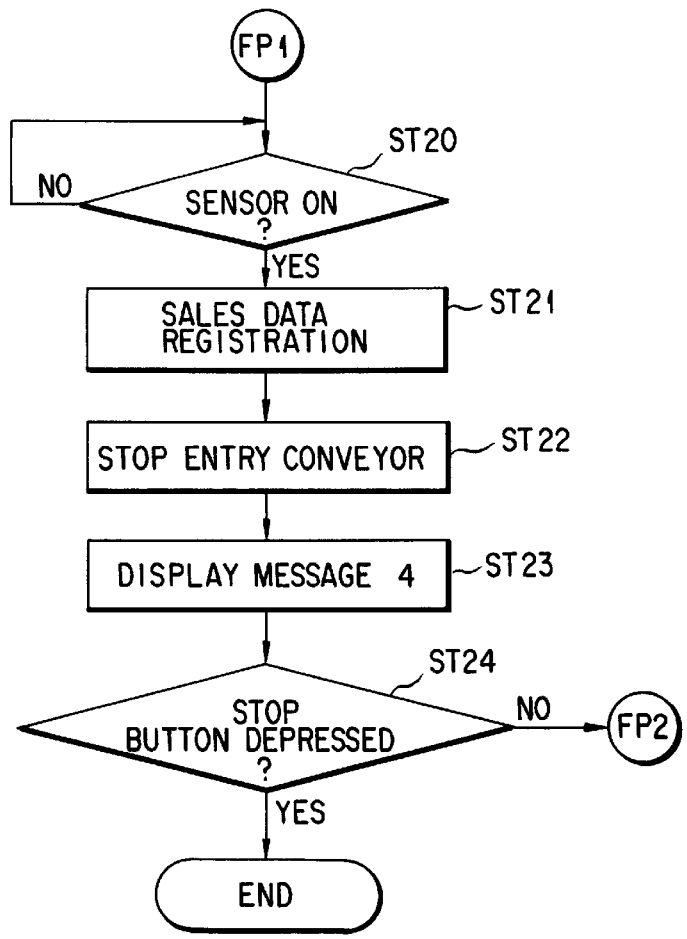

Further, the CPU 31 is programmed to operate according to the flow shown in FIG. 11, instead of that in FIG. 9. That is, when the measured weight data coincides with the reference weight data contained in the article data corresponding to the read article code, the entry conveyor 21 is driven in step ST19 shown in FIG. 8. In step ST30, it is checked whether this article data has an attention request flag "1". When the attention request flag "1" is detected, the display 35 displays a message noticing the possibility that the scanned article is replaced by a more expensive article, in step ST31. Thereafter, the same processing as that of the first embodiment is effected in steps ST32 to ST36.

When the attention request flag "1" is not detected in step ST30, the step ST32 is then executed. In the case where the cashier finds that the scanned article is replaced by another article after the display 35 displays the message, the cashier asks which one of the articles the customer wishes to purchase. When the customer wishes to purchase that one of the articles whose article code has not been read, the cashier inputs the article code of the article by using the scanner 33 or the keyboard 32 to register the article as a sales article.

According to the second embodiment, the display 35 displays a message noticing the possibility that a scanned article is replaced by another article having the same weight but a different price. Therefore, the cashier can find such a dishonest practice without continuously monitoring the customer's job. Further, the electronic weigh scale 22 is constructed to operate while the entry conveyor 21 is kept in a standstill state, the weight of an article can be precisely measured. In this case, each reference weight data stored in the article data table can have a small order value to reduce the number of articles which requires the attention request flag "1". As a result, the cashier's attention is not frequently called for. Accordingly, the job load on the cashier can be reduced, allowing a smooth settlement job while preventing a dishonest practice.

A check-out device according to a third embodiment of the present invention will now be described with reference to FIG. 12A to FIG. 13. This check-out device has basically the same construction as that of the first embodiment. Therefore, the same reference numerals denote the same or common portions as in the first embodiment, and a description thereof will be made briefly or omitted. The check-out device differs from that of the first embodiment in that the weight of an article on the entry conveyor 21 is measured at different convey points.

The entry conveyor 21 conveys an article from a point P1 near the scanner 11 to a point P2 near the outfeed conveyor 41, and the outfeed conveyor 41 conveys the article from the point P2 to a point P3 near the cash register 31A. The electronic weigh scale 22 measures the weight of the article before and after the convey operation is started. The article sensor 23 is a photosensor of a light-transmitting type which is arranged near the point P2 and senses an article conveyed by the entry conveyor 21.

Figure 13:
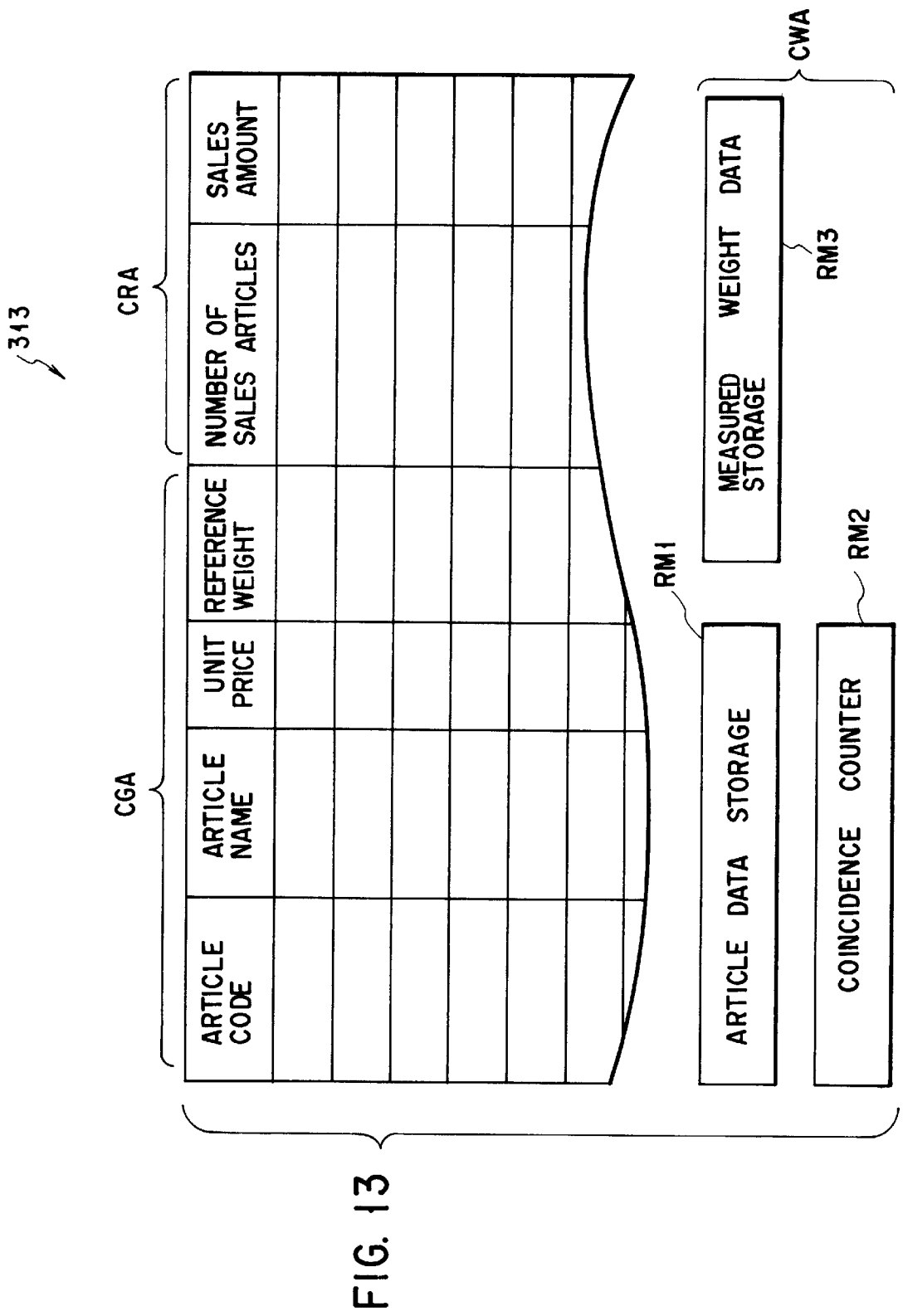
FIG. 13 is a memory map of a RAM used in the check-out device of the third embodiment.

As shown in FIG. 13, the RAM 313 in the cash register 31A includes a storage area CGA for storing an article data table, a storage area CRA for storing a sales data table, and a storage area CGA for storing work data. The storage area CWA includes article data memory RM1 for storing article data read out from the article data table, a counter RM2 for storing count data representing the number of times the reference weight data coincides with measured weight data, and a measured weight data memory RM3 for storing measured weight data obtained by the electronic weigh scale 22.

The CPU 311 is programmed so as to operate according to the flowchart shown in FIG. 14.

More specifically, in step ST41, it is checked whether or not the article code is read by the scanner 11. After outputting the article code from the scanner 11 via the interface IF, in step ST42, the CPU 311 initialize the coincidence counter RM2 so that the count data n is set to "0". The article data of an article specified by the article code input in step ST43 is searched from a data table, and the searched article data is read out. The read out article data is stored in the article data memory RM1. The CPU 311 reads in step ST44 the measured weight data being input via the interface IF from the electronic weigh scale 22. The measured weight data is then stored in the measured weight data memory RM3. In this case, executions of step ST44 are repeated while the measurement weight data is substantially "0". In step ST45, the CPU 311 compares the weight data in the weight data memory RM2 with the reference weight data in the article data memory RM1. When the difference between the measured weight data and the reference weight data falls within a predetermined allowable range, it is determined that the article whose article code is read by the scanner 11 is put on the entry conveyor 21. In this case, the CPU 311 controls the conveyor controller 29 in step ST46, so that entry and outfeed conveyors 21 and 41 are started. In step ST47, the CPU 311 re-reads the measurement weight data input from the electronic weigh scale 22 via the interface IF, and the measurement weight data is stored in the weight data memory RM3. In step ST48, the CPU 311 compares the measurement weight data in the weight data memory RM3 with the reference weight data in the article data memory RM1. when the difference therebetween falls within the afore-mentioned allowable range, the count data n of the coincidence counter RM2 is incremented by "1" in step ST49. If the difference goes beyond the allowable range, no increment is effected for the count data.

Thereafter, it is checked in step ST50 whether or not the article passes through the article sensor 23. Unless the article passes it, the steps ST47 to ST50 are repeated. The count data n will normally reach the predetermined fixed value if no article is substituted for the article put on the entry conveyor 21 during the conveyance. When the passage of the article is detected in step ST50, it is checked in step ST51 whether or not the count data n reaches the predetermined fixed value. If the count data reaches the predetermined fixed value, it is determined that no substitution is effected, and registration of the scanned article is allowed. If the count data does not reach the predetermined fixed value, it is determined that substitution is effected, and registration of the scanned article is.

When the article registration is allowed, in step ST52, sales data registration is effected based on the article data stored in the article data memory 32. More specifically, in the sales data table, the number of the sales article is incremented by "1", and the sales amount is increased by the unit price of the article. Further, the article is registered as the sales article using the article code thereof. In this case, the name and the unit price of this sales article is displayed at the display 14. Thereafter, in step ST53, the CPU 311 instructs the conveyor controller 29 so that the entry and outfeed conveyors 21 and 41 are stopped, and waits for input of a subsequent article code or an operation of the close key in the keyboard 32.

Meanwhile, if the article registration is refused, the CPU 311 sends, in step ST54, to the conveyor controller 29 an instruction for forcibly stopping the entry and outfeed conveyors 21 and 41, and executes an error processing for displaying an error message or generating alarm sound.

In step ST45, if the weight difference exceeds the predetermined acceptable range, it is determined that an article other than the article whose article code is read by the scanner 11 is put on the entry conveyor 21, and the error processing is executed.

According to the embodiment of the present invention thus constructed, a customer performs the registering of the articles to be purchased. More specifically, after finishing his or her shopping, a customer goes to the point P1 at which the scanner 11 is mounted, inputs the article code of each article using the scanner 11, and put the article on the entry conveyor 21. Then, the article data table is searched in accordance with the article code read by the scanner 11, so that article data which contains the reference weight data of the article is read, and the read data is stored in the memory RM1. The weight of the article on the entry conveyor 21 is measured by the electronic weigh scale 22, and the measured weight data from the electronic weigh scale 22 is stored in measured weight data memory RM3. When the difference between the measured weight data and the reference weight data falls within the acceptable range, it is determined that the article whose article code is read by the scanner 11 is put on the entry conveyor 21, and the conveyors 21 and 41 are driven to start conveyance of the article.

According to this embodiment, the weight of an article put on the conveyor 21 is measured a plurality of times during the conveyance thereof. Every time when the weight of the article is measured, it is checked whether or not the difference between the measured weight and the reference weight is in an acceptable range. Then, the number of times, which is determined as an acceptable range of the weight difference, is counted, and set to the coincident counter RM2 as count data. If it is detected that the articles are passed through the point P2 by the article sensor 23, it is discriminated whether or not count data n of the coincident counter RM2 reaches the fixed value, which is set in advance. It is assumed that the fixed value is set three times in the five measuring operations. If the number of times, which is determined as an acceptable range of the weight difference, is three times or more, it is discriminated that substitution of the article is not effected while the article is conveyed by the entry conveyor 21, and the article is registered as a sales article by using the read article code. If the number of times, which is determined as an acceptable range of the weight difference, is less than three times, it is discriminated that the substitution of the article is effected while the article is conveyed by the entry conveyor 21, and the error process, and conveyors 21 and 41 are forced to be stopped.

The fixed value is set in consideration of the case in which the difference between the measured weight and the reference weight is not in the acceptable range due to the change of the measuring conditions even if no substitution of the article is effected. Therefore, if the customer replaces the article on the conveyor 21 by a large-sized article of the same type during the conveyance, such a dishonest action can be surely detected. As a result, a cashier, who operates an electronic cash register 31A, may watch only the article conveyed by the outfeed conveyor 41, so that the operator's loads can be reduced. Moreover, substitution of the article on the conveyor 21, can be prevented without covering the convey path of the entry conveyor 21 with an enclosure. Therefore, the size of the checkout device can be reduced, the manufacturing cost is also reduced, and the practical use of the check-out device can be improved.

In the above embodiment, the weight of an article is repeatedly measured after the operation of conveyor 21 is started in step ST46 of FIG. 14. However, substitution of this article can be detected by at least one measurement after starting the operation of the conveyor 21.

A check-out device of a fourth embodiment of the present invention will now be described with reference to FIG. 15.

The basic structure of the check-out device is the same as that of the first embodiment. Therefore, the same reference numerals are added to the same portions as the first embodiment and the common portions to the first embodiment, and the explanation is simplified or omitted. The check-out device of the fourth embodiment differs from that of the first embodiment in the point that measured weight data of the certain articles are not compared with reference weight data of the articles. The reference weight data is not changed from the initial value "0" in the article data table.

According to this check-out device, the CPU 311 is programmed so as to perform the process shown in FIG. 15 in place of the step ST18 shown in FIG. 8. More specifically, the CPU 311 reads out, from the article data table, article data of the article corresponding to the read article code, and confirms that reference weight data included in the article data is not "0" Then, the CPU 311 effects checking of dishonest acts. In this checking, the reference weight data is compared with measured weight data, and it is checked whether or not the weight difference therebetween is in the acceptable range.

If the reference weight data is "0", the CPU 311 waits for a passage of a preset period required for the checking of unjustness. The processing is ended after the preset period is passed.

Generally, it needs much time and labor to set the reference weight of all the articles for sale to the article data table. If the articles having the same weight are extremely low price, a financial loss caused by the substitution of these articles is relatively small. Therefore, the check-out device of this embodiment can improve working efficiency in setting the reference weight without checking the unjustness of such articles.

Moreover, this check-out device is operated to reduce the difference between time for processing the articles whose unjustness is not checked and time for processing the articles whose unjustness is checked. Due to this, it is possible to prevent the customer from discovering the articles whose unjustness is not checked.

Additionally, according to the check-out device of this embodiment, reference weight data of articles are set in the article data table. However, the reference weight data can be recorded in the articles together with the article code in the form of the bar-code, for example. In this case, the CPU 311 compares measuring weight data, which can be obtained from the electronic weigh scale 22, and reference weight data, which can be obtained from the scanner 11.

Moreover, the check-out device of this embodiment is structured such that measured weight data from the electronic weigh scale 22 is not compared with reference weight data when the reference reference weight data is "0" showing the article whose unjustness is not checked. However, if there is provided an identifier showing the article whose unjustness is not checked in the article data table, the check-out device may be structured such that comparison between reference weight data and measured weight data can be made. In this case, if non-coincidence is detected in comparison between these weight data, it is necessary to confirm from the identifier that the unjustness of the articles is not checked, and to disregard the result of the comparison.

The check-out device of a fifth embodiment of the present invention will be described with reference to FIGS. 16 to 19. The basic structure of the check-out device is the same as that of the first embodiment. Therefore, the same reference numerals are added to the same portions as the first embodiment and the common portions to the first embodiment, and the explanation is simplified or omitted. The check-out device of the fifth embodiment is different from that of the first embodiment in the point that the entry conveyor 21 conveys unregistered articles put on the tray.

Figure 16:
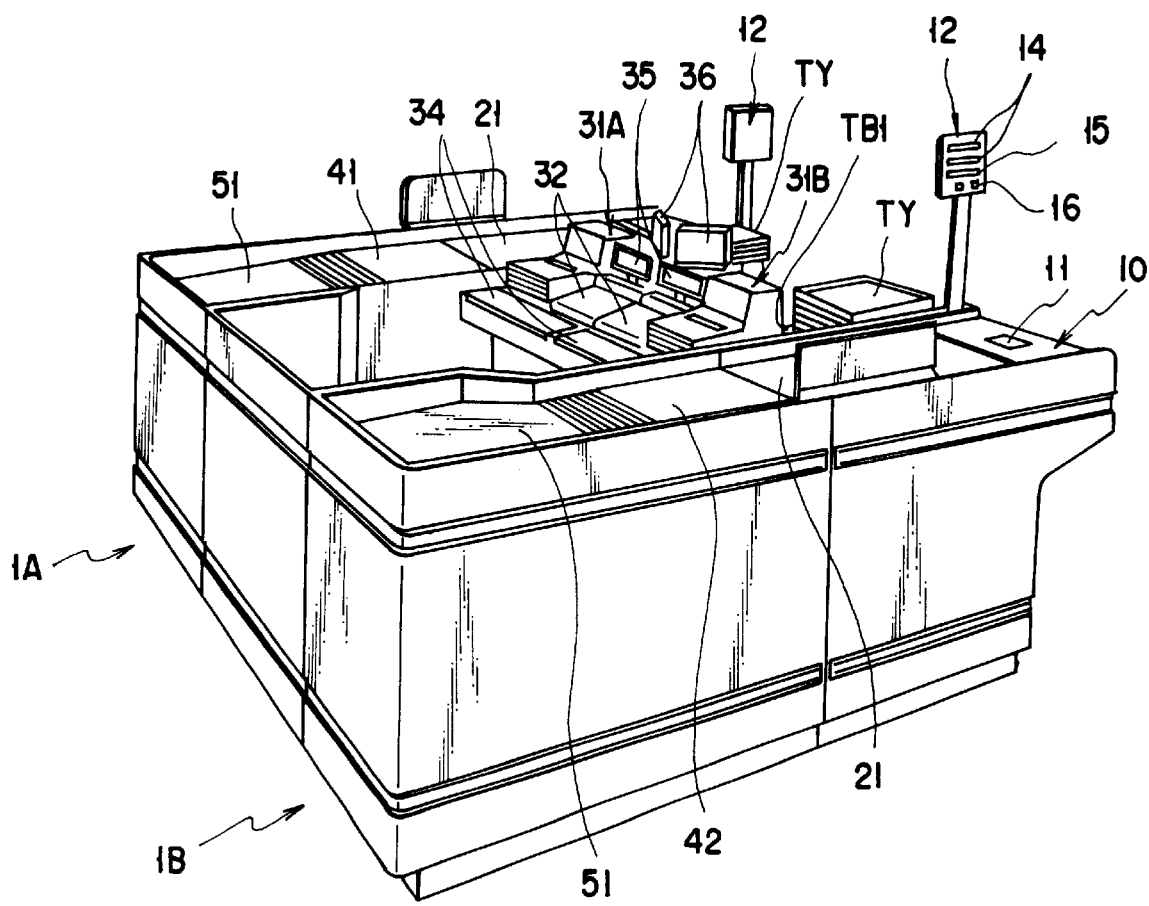
FIG. 16 is a perspective view of a check-out device according to a fifth embodiment of the present invention.
Figure 17:
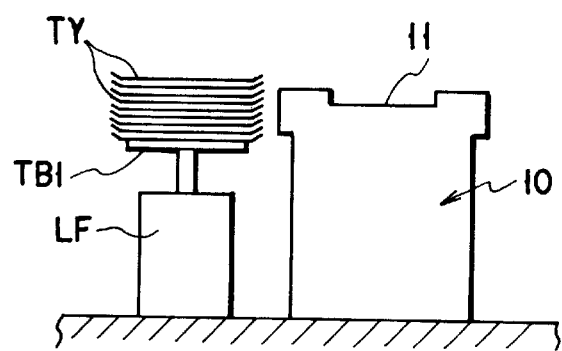
FIG. 17 is a view showing the construction of an input section shown in FIG. 16 in more detail.

As shown in FIGS. 16 and 17, the input section 10 of the check-out device has a lift LF, and a container base TB1, which is moved up and down by the lift LF, in place of the shelf TB. The container base TB1 is used to stack a number of trays 18, serving as a container. The lift LF is connected to the CPU 311 via the interface IF as shown in FIG. 18.

Figure 19:
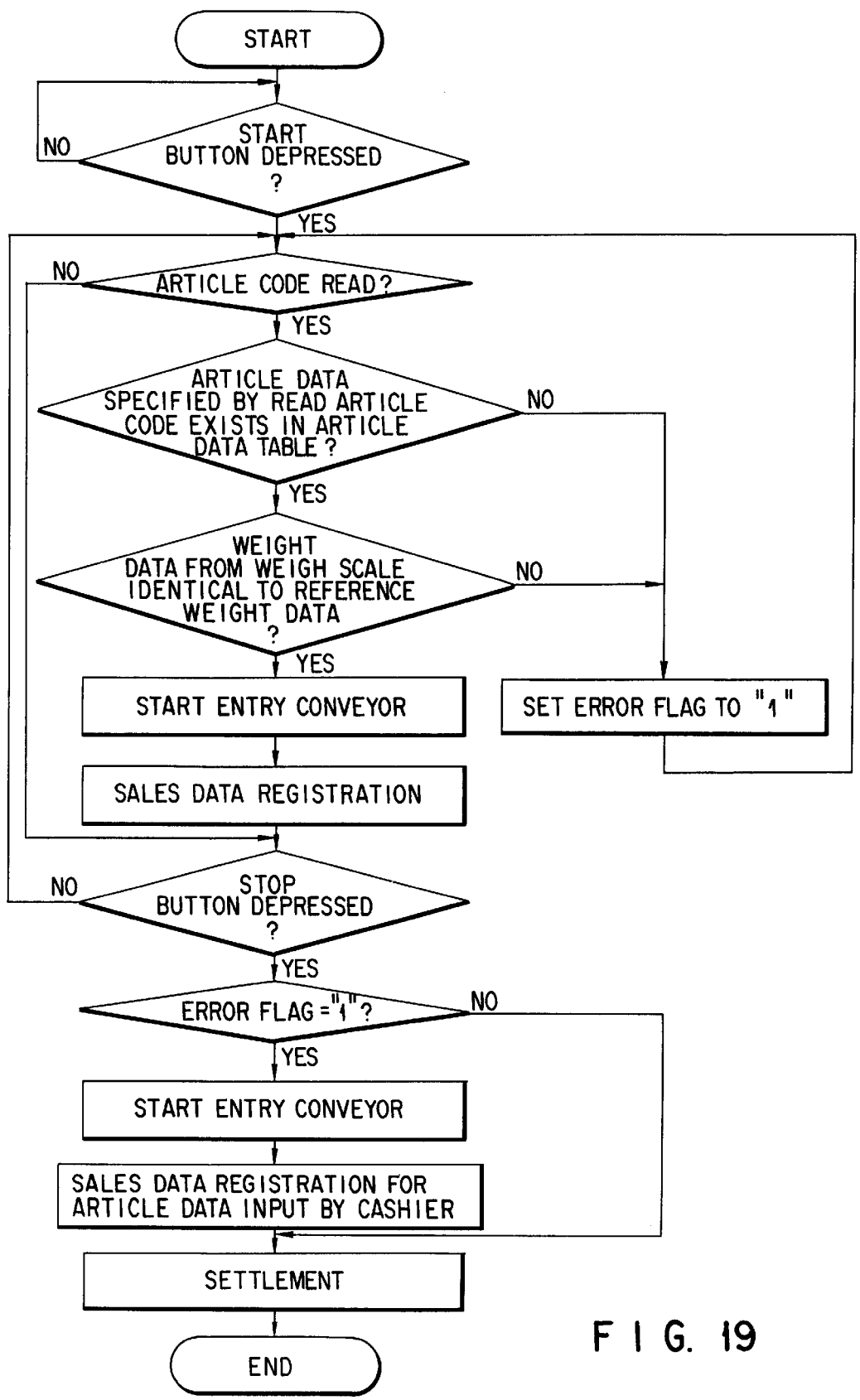
FIG. 19 is a flowchart for explaining the operation of the check-out device shown in FIG. 16.

According to this check-out device, the CPU 311 is operated in accordance with the flow shown in FIG. 19. A customer puts articles to be purchased in a shopping bag or a shopping cart and comes to the input section 10. When the customer depresses the start button 15 of the operation panel to input the article code, a message of "PLEASE SCAN ARTICLE" is displayed on the display 14 of the operation panel 12. The customer visually confirms the message and inputs the article code of the article by the scanner 11. In the cash register 31A, if the article data table is searched based on the article code obtained from the scanner 11, and existence of article data of the article corresponding to the article code is confirmed, the display 14 displays a message of "PLEASE PUT THIS ARTICLE ON ENTRY CONVEYOR." The customer visually confirms the message, and puts the article whose article code is read by the scanner 11 on the entry conveyor 21. The electronic weigh scale measures the weight of the article put on the conveyor 21, and outputs measured weight data.

In the electronic cash register 31A, article data specified by the input article code is read from the article data table, and the reference weight data included in the article data is compared with the measured weight data from the electronic weigh scale 22. If a result of the comparison is in the predetermined acceptable range, the article code read by the scanner 11 is registered as that of a sales article in the area CWA of RAM 312, and the entry conveyor 21 is driven. After all articles are sequentially registered and conveyed, the settlement for these articles is performed based on article data corresponding to the registered article codes.

According to this check-out device, if the read article code does not specify article data which exists in the article data table or the measured weight data does not coincide with the reference weight data, the CPU 311 causes the display 14 to display a message of "PLEASE PUT THIS ARTICLE ON TRAY", and sets the error flag showing the existence of unregistered article to the area CWA of RAM 313. The customer visually confirms the message and puts the article on the uppermost tray TY prepared on the container base TB1. Thereafter, the customer inputs the article code of the next article.

The customer depresses the stop button 16 of the operation panel 12 after inputting the article codes of all the articles to be purchased. If the stop button is depressed, it is checked whether or not the error flag is set. If it is set, the display 14 displays a message of "PLEASE PUT TRAY ON ENTRY CONVEYOR", and the entry conveyor 21, which is stopped after supplying the last article to the outfeed conveyor 41, is re-started. The customer visually confirms the message, and puts the tray TY containing at least one article on the entry conveyor 21. The entry conveyor 21 conveys the tray TY to the outfeed conveyor 41. The cashier additionally registers each article on the tray TY by inputting the article code of the article using the scanner 33 or the keyboard 32, and thereafter depresses the close key to instruct the settlement of all the registered articles.

In this check-out device, the tray TY is used to store unregistered articles which should be registered by the cashier instead of the customer. These articles are conveyed along with the tray TY to the cashier by the entry conveyor 21 after the customer has finished to register other articles to be purchased. Accordingly, it is not required that the customer puts the unregistered articles into the shopping bag or cart once again and carries them to the cashier. Thereby, even if the number of unregistered articles is large, the articles can be quickly delivered to the cashier by the entry conveyor 21.

Further, since it is not necessary to take out the unregistered articles one by one from the tray TY, there is no concern that the articles are erroneously fallen.

The lift LF raises the container base TB1 each time the tray TY is used, and keeps the uppermost tray TY on a level with the upper surface of the entry conveyor 21. Thus, even if a great number of articles are put on the tray TY, the articles can be moved onto the entry conveyor 21 very easily. The adjustment of the height of the container base TB1 can be effected by actuating the lift 16 on the basis of the position of the uppermost tray TY detected by, for example, a photosensor or a contact switch, the weight applied to the container base TB1 and detected by the scale, or the number of the remaining trays TY found by checking the number of times of additional registration by the cashier. In the present embodiment, the tray TY is used to temporarily store the unregistered articles. However, the tray TY may be replaced by, for example, a shopping basket.

The check-out device of this embodiment is constructed to automatically re-start the entry conveyor 21 in the standstill state when setting of an error flag is detected. However, the check-out device is not limited to have this structure. For example, the check-out device may be constructed to drive the entry conveyor 21 in response to the key operation of the cashier.

A check-out device according to a sixth embodiment of the present invention will now be described with reference to FIGS. 20 to 22.

The basic structure of this check-out device is similar to that of the first embodiment. Thus, the descriptions of the identical or common portions are simplified or omitted. This check-out device differs from the device of the first embodiment in that when the customer inputs the article code of a specific article (e.g. liquor, cigarette) directed to limited consumers, registration of such a specific article is refused.

The RAM 313, as shown in FIGS. 20 and 21, has an area CFA for storing an inhibit flag serving as a discrimination element, which inhibits registration of the article code input by the customer as that of a sales article. The area CFA is arranged such that it can be accessed by article codes contained in the article data table stored in the area CGA.

In FIG. 21, the inhibit flag "1" is set for articles B and D having article codes "02" and "04".

Figure 22:
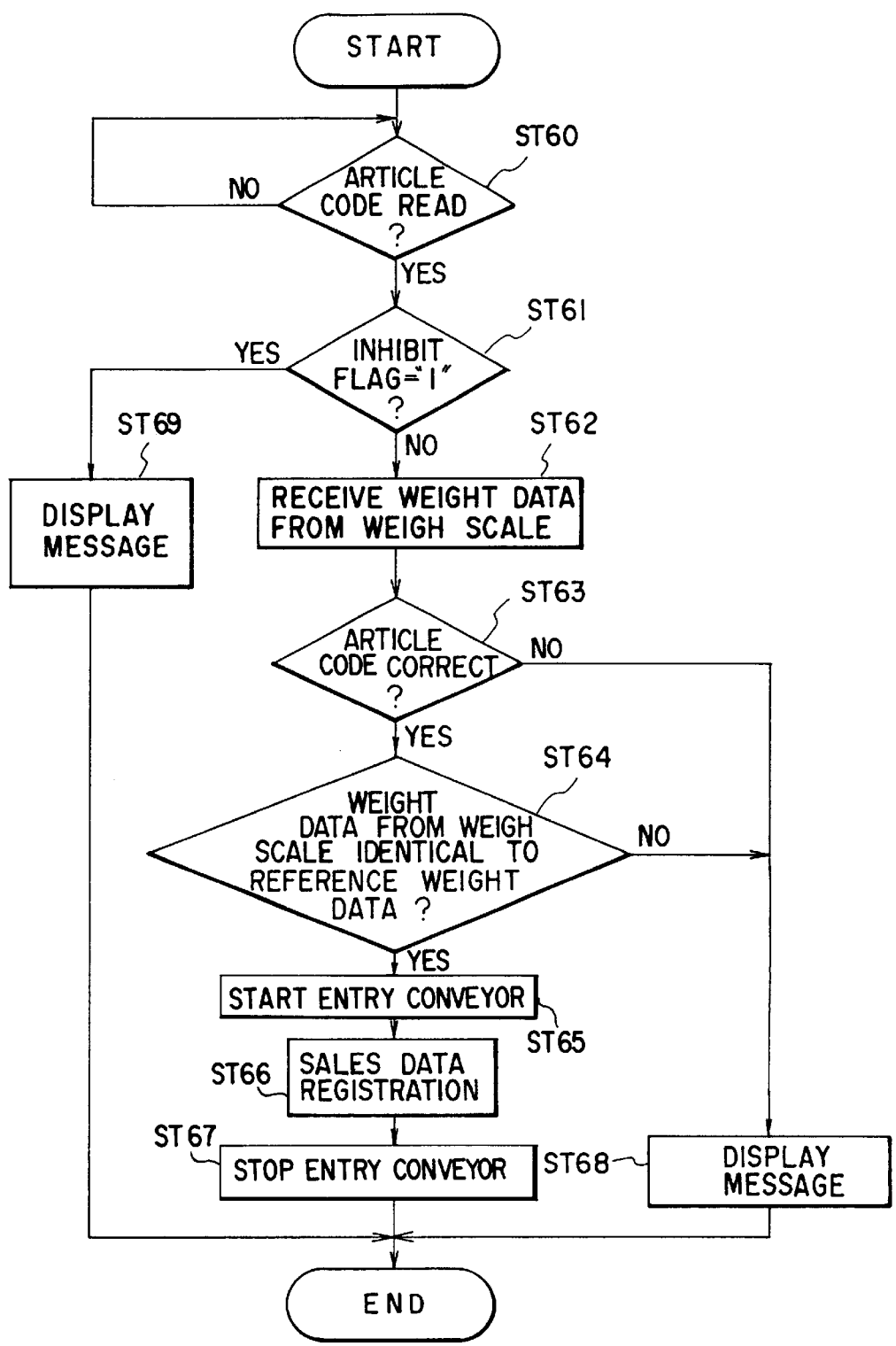
FIG. 22 is a flowchart for explaining the operation of the check-out device of the sixth embodiment.

In the check-out device, the CPU 311 is programmed so as to operate according to the flow shown in FIG. 22 after the start button 15 is depressed.

When the operation is started, the CPU 311 causes the display 14 to display a message of "PLEASE SCAN ARTICLE" and checks whether or not the article code of an article is read by the scanner 11 in step ST60. When the article code is read, it is stored in the area CWA of the RAM 313. Further, the article data of the article specified by this article code is read out from the article data table provided in the area CGA and is stored in the area CWA. In step ST61, the CPU 311 checks whether inhibit flag "1" is set for the article specified by the read article code.

When setting of inhibit flag "1" is detected, the CPU 311 causes the display 14 to display a message of "THIS ARTICLE IS NOT ACCEPTABLE, PLEASE TAKE IT TO CASHIER", and the display 35 to display the message to the effect that registration of the article is refused, and erases data relating to the article code of the refused article from the area CWA. Accordingly, this article code is not registered as that of a sales article, and the sales data table in the area CRA is not updated.

In FIG. 21, the inhibit flag "1" is set for an article B having an article code "02" since the article is a pack of five cigarettes. Even if the customer inputs the article code "02", this code input is determined to be invalid. Accordingly, this check-out device can prevent minors from buying cigarettes unconditionally.

On the other hand, the inhibit flag "1" is not set for an article C having article code "03". If the customer inputs the article code "03", this code input is determined to be valid. In this case, in step ST62, the CPU 311 enables the display 14 to display a message of "PLEASE PUT THIS ARTICLE ON ENTRY CONVEYOR," and stores, in the area CWA of the RAM 313, the measured weight data obtained by the electronic weigh scale 22. In step ST63, the CPU 311 checks whether or not the read article code is correct. When it is detected to be correct, the measured weight data is compared, in step ST64, with the reference weight data contained in the article data corresponding to the read article code. When non-coincidence of weight data is detected in step ST64, the display 14 displays, in step ST68, a message of "PLEASE REMOVE THIS ARTICLE FROM ENTRY CONVEYOR AND SCAN IT AGAIN." This applies to the case where an error of article code is detected in step ST63.

When coincidence of weight data is detected in step ST64, the CPU 311 permits, in step ST64, the conveyor controller 29 to drive the entry conveyor 21. As a result, the article on the entry conveyor 21 is conveyed to the outfeed conveyor 41. In step ST66, the sales data table is updated on the basis of the article data read from the article data table and stored temporarily in the region CWA of the RAM 313. Further, the input article code is registered as that of a sales article. In step ST67, the CPU 311 confirms the fact that the sensor 23 has detected the article during conveyance, and enables the conveyor controller 29 to stop the entry conveyor 21. Thereafter, the CPU 31 enables the display 14 to display a message of "PLEASE SCAN THE NEXT ARTICLE OR DEPRESS STOP BUTTON."

Subsequently, the above processing is repeated for other articles.

After scanning all the articles to be purchased, the stop button 16 is depressed to finish the article registration. Then, settlement for the articles is performed on the basis of their article data, and a total sales amount is displayed on the display 36. If there is an article whose article code is failed to be read by the scanner 11 or whose article code is refused after reading, the cashier receives the article from the customer and inputs the article code of the article by using the keyboard 32 or scanner 33. The total sales amount is updated on the basis of the article data corresponding to the additionally input article code. In addition, the sales data table is updated similarly. The customer pays the total sales amount displayed on the display 36 and goes out with the purchased articles.

As described above, according to the check-out device of this embodiment, it is checked whether the inhibit flag is contained in the article data of the article specified by the article code input by the customer. When the inhibit flag is detected, the article code is not registered as that of a sales article. Further, since the display 14 tells the customer that registration of the article is refused, the cashier does not need to directly give a caution to minors who tried to buy a prohibited article (i.e., cigarette, liquor, or the like). Thus, neither the cashier nor customer will undergo an unpleasant experience. Therefore, without forcing a severe task on the cashier, unfair conducts can be prevented and smooth settlement can be performed.

In this embodiment, inhibit flags are provided on articles, buyers of which are limited. The inhibit flags, however, may be provided for high-price articles or articles unsuitable for conveyor transfer, such as special-shaped articles, glass products, etc.

In the case where inhibit flags are provided on high-price articles, the article codes of these articles are input by the cashier, instead of the customer. The display 36 displays a sales amount when the cashier inputs the article code of a high-price article. If the customer requests cancellation of the purchase of the article because of the price there is higher than expected, the cashier can meet the request by not registering the article. In this case, exact calculation is performed on the registered article other than the canceled high-price article. The cashier's work is simplified, compared to the case where part of the registered articles is canceled.

A check-out device according to a seventh embodiment of the present invention will now be described with reference to FIGS. 23 to 25.

This apparatus is similar to the first embodiment in basic structure. Therefore, the components identical or similar to those of the first embodiment will be designated at the same reference numerals in FIGS. 23 to 25, and will not be described in detail. The check-out device shown in FIGS. 23 to 25 is different from the first embodiment in that the conveyor speed can be switched in accordance with the type of the article to convey.

As is shown in FIG. 23, the CPU 311 is connected by the interface IF to a file controller FL which has a master file containing an article data table. In response to a request from the CPU 311, the file controller FL fetches the article data table from the master file. The article data table is stored into the RAM 313. The conveyor controller 29 is designed to set the motor speed of the conveyors 21 and 41, in accordance with a speed-setting signal supplied from the CPU 311. The RAM 313 has a region SS for storing a conveyor-speed table input from, for example, the external computer or the keyboard 32.

Figures 24, 25:
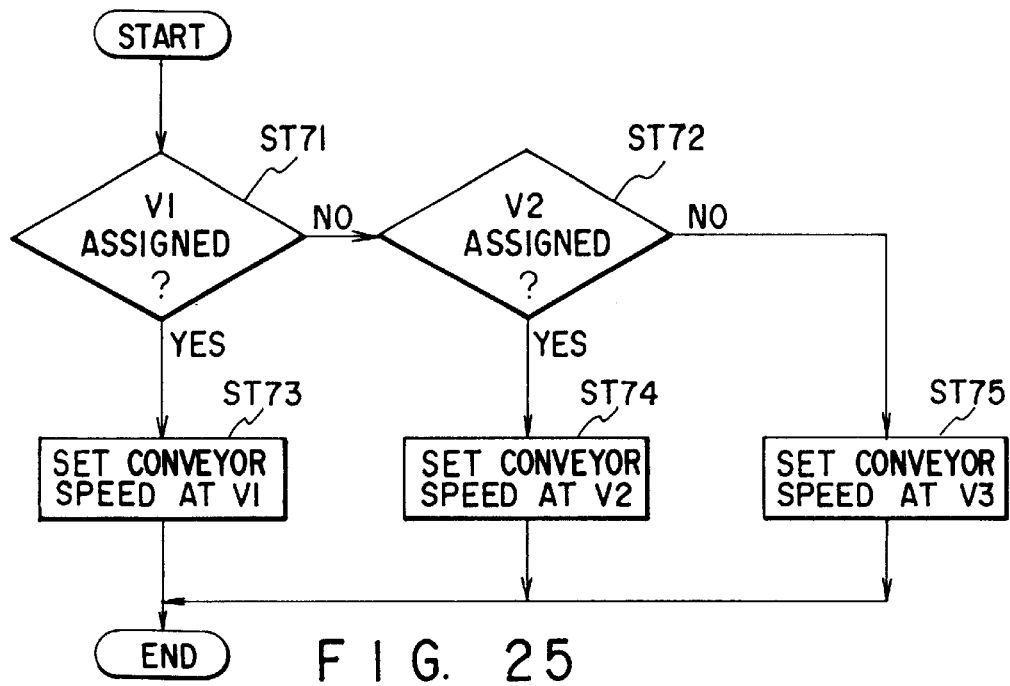
FIG. 24 is a memory map of a conveyor speed table stored in a RAM shown in FIG. 23.
FIG. 25 is a flowchart for explaining the operation of the check-out device of the seventh embodiment.

As is shown in FIG. 24, the conveyor-speed table consists of data items representing conveyor speeds V1, V2 and V3. The conveyor speed V1 is assigned to a first group of articles identified by article codes "001" to "020." The conveyor speed V2 is assigned to a second group of articles identified by article codes "021" to "150." The conveyor speed V3 is assigned to a third group of articles identified by article codes "151" to "170."

The speed V1 is a low speed, the speed V2 is an intermediate speed, and the speed V3 is a high speed. One of these speeds is selected, primarily in accordance with the shape and size of an article to convey. For example, the speed V1 is selected to convey a spherical article, and the speed V3 is selected to convey a cubic article.

Nonetheless, the conveyor speed need not be assigned to a group of articles which have particular shape and size. Generally it suffices to assign each speed to a group of articles which have features closely related to that conveyor speed. Further, four or more conveyor speeds can be set in the check-out device.

The type of the speed-setting signal can be selected in accordance with the structure of the conveyor controller 29. In the seventh embodiment, the CPU 311 supplies the digital data representing the speed V1, V2, or V3 to the controller 29 through the interface IF. If the controller 29 needs a voltage (i.e., analog) signal which is proportional to a selected speed, however, the interface IF contains an A/D converter for converting the digital data into such a voltage (analog) signal.

The check-out device is constructed such that the CPU 311 performs a process shown in FIG. 25 each time an article code is input by one of the stationary scanner 11, the handy scanner 33, and the key-board 32. More specifically, the CPU 311 searches the conveyor-speed table to find the speed assigned to any article identified by the input article code. In step ST71, the CPU 311 determines whether or not the speed V1 is assigned to the article code. If YES, the CPU 311 supplies a signal to the conveyor controller 29. This signal sets the conveyor speed at speed V1. If NO in step ST71, the CPU 311 determines whether or not the speed V2 is assigned to the article code. If YES in step ST72, the CPU 311 supplies a signal to the conveyor controller 29. The signal sets the conveyor speed at speed V2. If NO in step ST72, the CPU 311 supplies a signal to the conveyor controller 29. This signal sets the conveyor speed at speed V3.

In the seventh embodiment (FIGS. 23 to 25), the conveyor speed is automatically switched to the speed at which to convey a specific article, in accordance with the code of this article. Hence, the less stable the article, the more slowly it will be conveyed; the more stable the article, the faster it will be conveyed. The time intervals at which to scan the articles being conveyed need not lengthened too much.

Since the conveyor-speed table can be altered merely by rewriting it in the storage region SS of the RAM 313, it is possible to convey articles of various shapes and size, each type of article at the best possible speed. To rewrite the table, it suffices to operate the keyboard 32. Hence, the conveyor speed can switched to a speed appropriate for discount articles with no article codes affixed thereto.

Figures 26, 27:
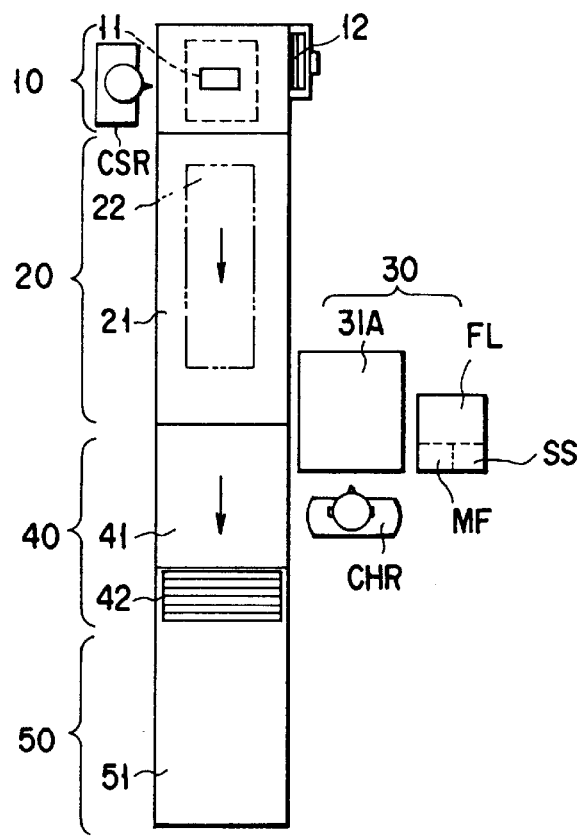
FIG. 26 is a view showing storage areas for an article data table and a conveyor speed table which are provided in a file controller shown in FIG. 23.
FIG. 27 is a memory map of tables stored the storage areas shown in FIG. 26.

In the seventh embodiment, a conveyor-speed table is stored in the RAM 313, independently of an article data table. According to the present invention, however, the conveyor-speed table can be incorporated into the article data table. FIG. 26 shows a file controller FL which has two regions MF and SS for storing an article data table and a conveyor-speed table, respectively. As is shown in FIG. 27, the region SS is located beside the region MF. In response to a request supplied from the CPU 311, the file controller FL supplies not only the article data table but also the conveyor-speed table to the RAM 313, so that the conveyor-speed table is stored in the region CGA of the RAM 313, as part of the article data table. Therefore, when a specific article data item is retrieved from the article data table in accordance with an article code, the conveyor speed suitable for the article identified by the article code will be obtained, along with the unit price etc. of the article. For example, when the code "1000" is input, article name "A", unit price "500," and conveyor speed "V2" will be output.

In the case where the article-data table stored in the region CGA of the RAM 313 includes the conveyor-speed table, the RAM 313 need not store article codes other than those for retrieving article data items. The storage capacity of the RAM 313 can be used effectively, and the conveyor-speed data item can be retrieved within a shorter time. Further, the conveyor speeds V1 to V3, which have been assigned to three groups of articles, respectively, can easily be altered, whenever necessary.

The check-out device can be so designed as to set conveyor speeds at which to drive the entry conveyor 21 and to set conveyor speeds at which to drive the outfeed conveyor 41. In this case, the entry conveyor 21 can be driven at a low speed to convey articles which cannot be correctly weighed if conveyed at a relatively high speed. This makes it possible to weigh articles with a sufficient accuracy by means of an inexpensive electronic weigh scale.

Figure 29:
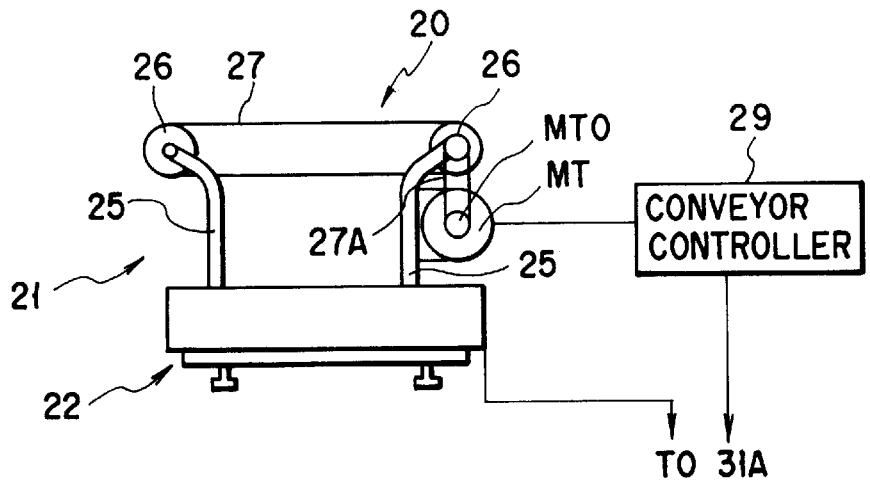
FIG. 29 is a view showing an entry section of the check-out device of the eighth embodiment.
Figure 30:
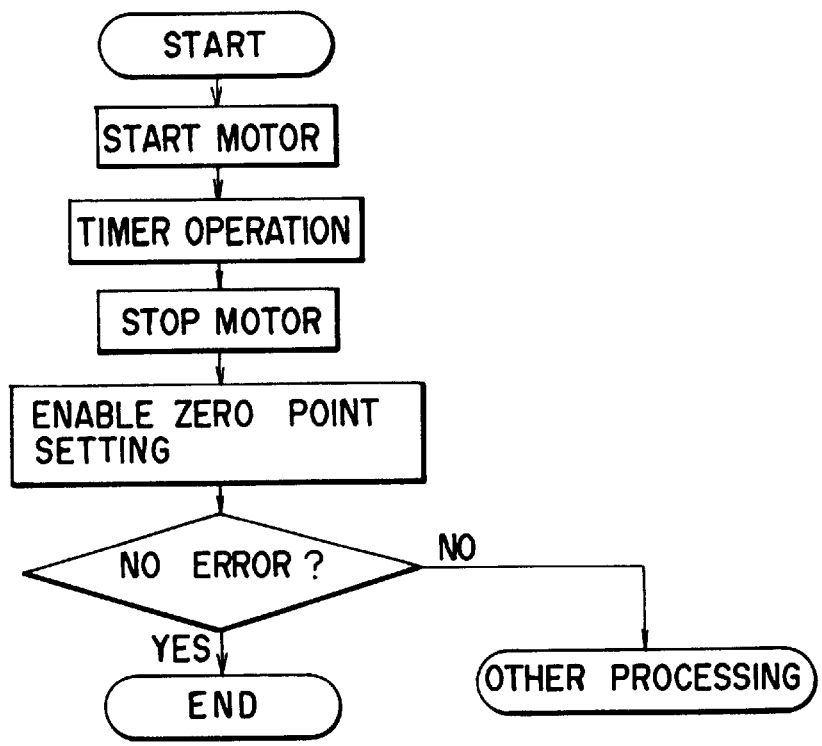
FIG. 30 is a flowchart for explaining the operation of the check-out device of the eighth embodiment.

A check-out device according to the eighth embodiment of the invention will now be described with reference to FIGS. 28 to 30.

This apparatus is similar to the first embodiment in basic structure. Therefore, the components identical or similar to those of the first embodiment will be designated at the same reference numerals in FIGS. 28 to 30, and will not be described in detail.

The check-out device shown in FIG. 28 is different from the first embodiment in that the entry conveyor 21 is automatically driven to set the weigh scale 22 at its zero point, when the power-supply switch of the apparatus is turned on. (In the first embodiment, the scale 22 is set at its zero point in the conventional method.)

As is shown in FIG. 28, a timer TM is connected by the bus line to the CPU 311. The entry section 20 is constructed as shown shown in FIG. 29. As is shown in FIG. 29, the weigh scale 22 comprises a load cell scale for measuring the load applied through a pair of support arms 25. The arms 25 connect the scale 22 to the entry conveyor 21. The conveyor 21 comprises support rollers 26 rotatably attached to the tips of the arms 25, respectively, and an endless conveyor belt 27 wrapped around these rollers 26, with a predetermined tension exerted on it. An article will be put on the upper surface of the endless belt 27, which extends from the one roller 26 to the other roller 26. The entry conveyor 21 further comprises a motor MT for driving the belt 27, and a belt 27A wound around the shaft MTO of the motor MT and one of the rollers 26. The motor MT is controlled by the conveyor controller 29.

In operation, once an article is put on the upper surface of the conveyor belt 27, this article will be weighed and conveyed.

To be more specific, the weight of the article on the belt 27 is applied to the weigh scale 22 through the belt 27, the support rollers 26, and the support arms 25. Hence, the scale 22 weighs the article. In the meantime, the CPU 311 supplies a drive instruction to the conveyor controller 29 via the interface IF. Upon receipt of the instruction, the controller 29 drives the motor MT. The rotation of the motor MT is transmitted to one of the rollers 26 through the belt 27A. The belt 27, wound around the rollers 26, is thereby driven, whereby the article on the belt 27 is conveyed.

With reference to the flow chart of FIG. 30, it will be described how the check-out device (FIG. 28) operates to set the weigh scale 22 at its zero point.

When the power-supply switch of the apparatus is turned on, the CPU 311 instructs the conveyor controller 29 to drive the motor MT, and then sets the timer TM. The moment the timer TM detects an elapse of a predetermined time, the CPU 311 instructs the controller 29 to stop the motor MT. The predetermined time is equal to the time the belt 27 requires to travel a distance slightly longer than the distance between the support rollers 26. After the motor MT has stopped, the CPU 311 supplies a zero-point setting command to the scale 22. Thereafter, the CPU 311 determines whether or not the scale 22 has been at its zero point. If it is determined that the motor MT has been set at the zero point, the CPU 311 will no longer supply the zero-point setting command. If it is determined that the motor MT has not been set at the zero point, the CPU 311 will then perform error processing.

In the eighth embodiment, the weigh scale 22 is not set at is zero point before the conveyor belt 27 finishes traveling a distance slightly longer than the distance between the support rollers 26 at the time the power-supply switch is turned on. Hence, articles on the belt 27, if any, are removed from the conveyor belt 27, and their weights are no longer applied to the scale 22. As a result, the scale 22 can be set at the zero point with high accuracy, and the weight of any article the scale measures thereafter is reliable.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A check-out device comprising:

reading means for reading an article code affixed to an article;

conveyor means for conveying the article whose article code is read by said reading means;

weighing means for measuring a weight of the article on said conveyor means before the article is conveyed by said conveyor means, to produce measured weight data; and processing means including:

means for obtaining reference weight data of the article corresponding to the article whose article code was read by said reading means; and means for:

comparing the obtained reference weight data with the measured weight data produced by said weighing means, producing a confirmation signal when the reference weight data substantially equals the measured weight data, and performing a sales processing for the article whose article code is read by said reading means only after production of said confirmation signal indicating that the article whose article code is read is identical to the article whose weight is measured by said weighing means, and conveyor control means for permitting said conveyor means to operate to convey the article whose article code is read by said reading means only after said confirmation signal is produced, and inhibiting operation of said conveyor means to prevent conveying of an article until said confirmation signal is produced.

2. A check-out device according to claim 1, wherein said conveyor means includes an entry conveyor, and said weighing means includes a weigh scale for measuring weight of the article put on said entry conveyor.

3. A check-out device according to claim 2, wherein said conveyor control means includes:

an article sensor for sensing the article at an exit of said entry conveyor;

means for starting an operation of said entry conveyor only after generation of said confirmation signal confirming that the article whose article code is read is identical to the article whose weight is measured by said weighing means; and means for stopping operation of said entry conveyor when said article sensor senses an article passing through said exit of said entry conveyor.

4. A check-out device according to claim 3, wherein:

said processing means includes input means for instructing start and stop of inputting article codes for a variable number of articles, said conveyor means includes an outfeed conveyor for conveying an article sent from said entry conveyor, and said conveyor control means further includes:

means for starting an operation of said outfeed conveyor in response to an input start instruction from said input means; and means for stopping the operation of said outfeed conveyor in response to an output stop instruction from said input means.

5. A check-out device according to claim 1, wherein said processing means further includes specific article detection means for detecting that the article whose article code is read by said reading means should be treated in a different way from other articles.

6. A check-out device according to claim 1, further comprising memory means for storing article data associated with each of various articles, each of said article data including an article code of the associated article and said reference weight data of the associated article, and wherein said means for obtaining obtains said reference weight data of the article corresponding to the article whose article code was read by said reading means, from said memory means.

7. A check-out device according to claim 6, wherein:

said memory means holds article data which further includes a flag for indicating a specific article whose weight is substantially the same as that of another article and whose price is different from that of said another article; and said processing means further includes means for indicating to an operator when it is detected that article data of the article corresponding to the article code read by said reading means contains the flag.

8. A check-out device according to claim 6, wherein:

said memory means holds article data which further includes a flag for indicating a specific article whose purchaser is restricted; and said processing means further includes means for calling for at least a customer's attention when it is detected that article data of the article corresponding to the article code read by said reading means contains the flag indicating a specific article whose purchaser is restricted.

9. A check-out device according to claim 6, wherein:

said memory means holds article data which further includes a flag for indicating a specific article which is not suitable for conveyance by said conveyor means; and said processing means further includes means for calling for at least a customer's attention when it is detected that article data of the article corresponding to the article code read by said reading means contains the flag indicating a specific article not suitable for conveyance by said conveyor means.

10. A check-out device according to claim 1, wherein the article code read by said reading means includes an indication of said reference weight data which is also read by said reading means.

11. A check-out device comprising:

reading means for reading an article code affixed to an article;

weighing means for measuring a weight of the article whose article code is read by said reading means to produce measured weight data;

memory means for storing:

article data associated with each of various articles, each of said article data including:

an article code of the associated article, reference weight data of the associated article, and a flag for indicating whether or not the associated article has a price lower than a predetermined amount; and processing means, including:

means for obtaining from said memory means the reference weight data of the article corresponding to the article whose article code was read by said reading means;

means for:

comparing the obtained reference weight data with the measured weight data produced by said weighing means, producing a confirmation signal when the reference weight data substantially equals the measured weight data, performing a sales processing for the article whose article code is read by said reading means only after production of said confirmation signal indicating that the article whose article code is read is identical to the article whose weight is measured by said weighing means; and enabling means for enabling performing of the sales processing when it is detected that article data of the article corresponding to the article code read by said reading means contains the flag, regardless of the production of said confirmation signal.

12. A check-out device according to claim 11, wherein said memory means holds the reference weight data of zero value serving as the flag indicating the specific article.

13. A check-out device according to claim 11, wherein said enabling means includes means for delaying execution of the sales processing by a predetermined period of time when it is detected that the article data of the article corresponding to the article code read by said reading means contains the flag, said predetermined period of time being substantially equal to a time period required to perform a comparison between the measurement weight data and the reference weight data when it is detected that the flag is not contained in the article data.

14. A check-out device comprising:

reading means for reading an article code affixed to an article;

conveyor means for conveying the article whose article code is read by said reading means;

weighing means for measuring a weight of the article on said conveyor means to produce measurement weight data;

memory means for storing article data of various articles, each of said article data including an article code and reference weight data; and processing means, including:

means for obtaining from said memory means the reference weight data of the article corresponding to the article whose article code was read by said reading means; and means for comparing the obtained reference weight data with the measured weight data produced by said weighing means and for producing a confirmation signal when the reference weight data substantially equals the measured weight data, for performing a sales processing for the article whose article code is read by said reading means after producing said confirmation signal indicating that the article whose the article code is read is identical to the article whose article code is measured by said weighing means; and wherein said processing means further includes:

repeating means for causing said comparing means to repeat the comparison between the measurement weight data and the reference weight data while the article is conveyed by said conveyor means, so as to provide comparison results; and inhibiting means for inhibiting the sales processing when it is detected from the comparison results that another article is substituted for the article on the conveyor means.

15. A check-out device according to claim 14, wherein said repeating means includes means for deciding the number of times the comparison is repeated; and said inhibiting means includes means for detecting the substitution when the number of times a difference between the measured weight data and the reference weight data falls within an acceptable range does not reach a preset value during the repetition of the comparison.

16. A check-out device comprising:

reading means for reading an article code affixed to an article;

weighing means for measuring a weight of the article whose article code is read by said reading means to produce measured weight data;

memory means for storing article data associated with each of various articles, each of said article data including:

an article code of the associated article, reference weight data of the associated article, and a flag indicating whether or not the associated article does not require a check for substitution, said flag being defined by said reference weight data of zero value; and processing means, including:

means for obtaining from said memory means the reference weight data of the article corresponding to the article whose article code was read by said reading means; and means for:

comparing the obtained reference weight data with the measured weight data produced by said weighing means, producing a confirmation signal when the reference weight data substantially equals the measured weight data, performing a sales processing for the article whose article code is read by said reading means only after production of said confirmation signal indicating that the article whose the article code is read is identical to the article whose weight is measured by said weighing means; and enabling means for enabling the sales processing when it is detected that article data of the article corresponding to the article code read by said reading means contains said flag, regardless of the production of said confirmation signal.

* * * * *